(12) United States Patent
Brotto

(10) Patent No.: US 7,497,275 B2
(45) Date of Patent: Mar. 3, 2009

(54) CORDLESS POWER TOOL SYSTEM WITH IMPROVED POWER OUTPUT

(75) Inventor: Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/702,208

(22) Filed: Feb. 5, 2007

(65) Prior Publication Data

US 2007/0193761 A1 Aug. 23, 2007

Related U.S. Application Data

(63) Continuation-in-part of application No. 11/266,242, filed on Nov. 4, 2005, now Pat. No. 7,273,159.

(51) Int. Cl.
*B25D 17/04* (2006.01)
(52) U.S. Cl. .......................... 173/217; 173/171
(58) Field of Classification Search ................ 173/217, 173/50, 171; 227/156
See application file for complete search history.

(56) References Cited

U.S. PATENT DOCUMENTS

| 4,081,704 | A | 3/1978 | Vassos et al. ................. 310/50 |
| 6,057,608 | A | 5/2000 | Bailey et al. .................. 307/43 |
| 6,075,341 | A | 6/2000 | White et al. ................. 320/114 |
| 6,324,339 | B1 | 11/2001 | Hudson et al. .............. 388/809 |
| 6,326,101 | B1 | 12/2001 | White et al. .................. 429/99 |
| 6,627,345 | B1 | 9/2003 | Zemlok et al. ................ 429/99 |
| 6,641,467 | B1 | 11/2003 | Robson et al. .............. 451/334 |
| 6,641,950 | B2 | 11/2003 | White et al. .................. 429/99 |
| 6,840,335 | B1 | 1/2005 | Wu ............................ 173/217 |
| 6,965,213 | B2 | 11/2005 | Schadoffsky et al. ....... 320/112 |
| 2002/0048706 | A1 | 4/2002 | Mayes et al. ............. 429/231.1 |
| 2005/0187783 | A1 | 8/2005 | Johnson et al. ................. 705/1 |
| 2005/0233220 | A1 | 10/2005 | Gozdz et al. ........... 429/231.95 |

FOREIGN PATENT DOCUMENTS

WO WO 2006/055303 A2 5/2006

OTHER PUBLICATIONS

Richards et al., "A Computer Controlled Power Tool for the Servicing of the Hubble Space Telescope", May 15, 1996, 30th Aerospace Mechanisms Symposium, pp. 325-328.
"Extravehicular Activity (EVA) Standard Interface Control Document", SSP 30256:001, Revision F, National Aeronautics and Space Administration International Space Station Program, Feb. 7, 1997, pp. 3-11-3-17.

(Continued)

*Primary Examiner*—Brian D Nash
(74) *Attorney, Agent, or Firm*—Michael Aronoff; Adan Ayala

(57) ABSTRACT

A cordless power tool system for improved power output includes a plurality of hand-held cordless power tools, where each power tool includes a tool housing, motor assembly, transmission/gear assembly and removable battery pack. The battery pack provides a nominal output voltage of approximately 25 volts or greater to a DC motor of the motor assembly. Each of the hand-held cordless power tools of the system has a power output to weight ratio of 70 watts per pound (W/lb) or greater.

24 Claims, 11 Drawing Sheets

OTHER PUBLICATIONS

Devin Tailor, "Pistol Grip Tool Technician Manual", Sep. 1997, pp. 42-46.

Staniewicz et al., "Safety Certification of Lithium Ion Cells for Manned Space Flight", Jun. 21, 1999, 6th Workshop for Battery Exploratory Development, Jun. 21-24, 1999, pp. 177-178.

Saft Batteries News Release, "Saft's lithium powers Hubble servicing", Engineeringtalk.com, Mar. 21, 2002, pp. 1-3.

Busniness Communications Co., Large and Advanced Battery Technology & Markets, Oct. 2004, p. 1.

Roos, Gina, Electronic Buyers' News, CMP Publications Inc., Jul. 5, 1999, Issue 1167, p. 49.

Machine Design, Polymer electrode boosts battery power, Penton Publishing Inc., Jan. 11, 1990, v62, n1, p. 14.

"News Trends, Polymer Electrode Boosts Battery Power," *Machine Design*, Jan. 11, 1990, p. 14.

International Search Report issued Jun. 25, 2007 in corresponding International Application No. PCT/US05/40208.

Written Opinion of the International Searching Authority issued Jun. 25, 2007 in corresponding International Application No. PCT/US05/40208.

A123 Systems, Lithium Ion Polymer Battery Nov. 2, 2005, Wikipedia, pp. 1-3.

Various Sources (see listed references), Lithium-Ion Battery, Feb. 2007, Wikipedia, pp. 1-7.

Various Sources (see listed references), Radio-Controlled Aircraft, 2004, Wikipedia, pp. 1-10.

CORDLESS POWER TOOL SYSTEM WITH IMPROVED POWER OUTPUT

PRIORITY STATEMENT

This application is a continuation-in-part of and claims domestic priority benefits under 35 U.S.C. §120 of commonly assigned U.S. patent application Ser. No. 11/266,242 to Daniele C. Brotto, filed Nov. 4, 2005, now issued as U.S. Pat. No. 7,273,159, the entire contents of which is hereby incorporated by reference herein.

BACKGROUND OF THE INVENTION

1. Field of the Invention

Example embodiments in general relate to providing ergonomically efficient cordless power tools as evidenced by desirable power-to-weight ratios, obtainable in part by reducing weight in one or more constituent weight groups of a given cordless power tool, while maintaining or improving the power output of the tool.

2. Description of Related Art

Users of cordless power tools such as drills, reciprocating saws, circular saws, hammer drills, etc., traditionally sacrifice the enhanced power features of corded tools for the advantages of a cordless environment, i.e., flexibility and portability. While corded power tools may generally offer the user greater power, cordless power tools offer the user ease of use.

A cordless power tool includes a self-contained power source (attached battery pack) and has a reduced power output as compared to a corded tool, due to the limitation on energy density of the cells in the battery pack due to impedance and voltage. Corded power tools thus offer greater power with less weight, as compared to cordless power tool systems. Thus, one problem is that a cordless power tool, in general, cannot closely approximate the performance of a corded power tool. Another problem is that the weight of a cordless power tool for a given power output may be higher and/or substantially higher than its corded counterpart.

From an ergonomic perspective, a way to evaluate tool system performance of a cordless tool is to determine the power-to-weight ratio of a given cordless power tool, and to compare it to the power-to-weight ratio of its corded counterpart, for example. The power-to-weight ratio may be defined as the maximum power output from a motor of a given power tool divided by the total system weight of the tool (system weight=weight of tool and battery pack for cordless power tools; weight of the tool for corded tools). The following provides a general understanding of MWO.

Maximum Watts Out (MWO)

Maximum Watts Out (MWO) generally describes the maximum amount of power out of a power tool system. For example, MWO may be considered to be the maximum power out of a motor of a tool system. Many factors may contribute to the MWO value, the primary factors being source voltage (the source being the battery in a cordless power tool system, the external AC power in a corded tool system), source impedance, motor impedance, current flowing through the system, gear losses and motor efficiency. Secondary factors may affect a power tool system's MWO (such as contact impedance, switch impedance, etc). In some cases, these secondary factors may be considered insignificant contributors as compared to the primary factors.

FIG. 1 is a block diagram of a generic cordless power tool system to describe power losses between the battery source and the motor output. System 100 may include a battery pack 110 which may comprise one or a plurality of cells. For a corded tool, battery 110 would be inapplicable and replaced with an external AC power source, such as a common 15 A, 120 VAC source. Rb 130 represents the internal impedance of the cells comprising the battery 110 (including straps and welds to connect the cells), and Rm 140 represents the internal impedance of motor 120. Motor 120 generally consumes greater current under heavy loads. Switch 150 may be a mechanical or electronic switch (such as a field effect transistor (FET), SCR or other transistor device) that connects the battery 110 to the motor 120.

In FIG. 1, "Vev" represents the electrovoltaic (EV) voltage or the theoretical no-load voltage of the battery 110. "Vbat" represents the actual, measurable voltage of the battery 110 and "Vmotor" denotes the actual, measurable voltage across the motor 120. "Vemf" represents a theoretical voltage presented to the motor 120 for conversion to power.

Power out of the motor is adversely impacted by mechanical inefficiency due to factors such as friction, gear losses, wind resistance (cooling fans, boundary layer friction, etc.) For purposes of this illustration, these losses are considered to be substantially small to non-existent.

When switch 150 is closed, a circuit is completed that allows current, to flow. The following voltages in expressions (1) to (3) are presented relative to ground:

$$Vbat = Vev - (current * Rb) \quad (1)$$

$$Vmotor = Vbat \quad (2)$$

$$Vemf = Vmotor - (current * Rm) \quad (3)$$

Assuming negligible mechanical losses, power out of the motor (WO, watts out) is described by expression (4):

$$WO = current * Vemf \quad (4)$$

At light motor loads, current is low and watts out (WO) is low. At higher motor loads, current is high and WO is high. At the highest motor loads, WO falls from the maximum and significant energy is lost in Rb and Rm. The power lost in Rb and Rm may be calculated as shown in expressions (5) and (6):

$$\text{Power lost in } Rb = current^2 * \text{value of } Rb (I^2 Rb) \quad (5)$$

$$\text{Power lost in } Rm = current^2 * \text{value of } Rm (I^2 Rm) \quad (6)$$

Table 1 provides an example of losses in power in a DC motor system comprised of an 18 volt battery with 150 milliohm impedance and a DC motor with 60 milliohm impedance.

TABLE 1

Power losses in DC motor system

| current (amps) | power lost in Rb (watts) | Vbat & Vmotor (volts) | power lost in Rmotor (watts) | Vemf (volts) | power out of motor (WO) (watts) |
|---|---|---|---|---|---|
| 0 | 0 | 18 | 0 | 18 | 0 |
| 5 | 4 | 17 | 2 | 17 | 85 |
| 10 | 15 | 17 | 6 | 16 | 159 |
| 15 | 34 | 16 | 14 | 15 | 223 |
| 20 | 60 | 15 | 24 | 14 | 276 |
| 25 | 94 | 14 | 38 | 13 | 319 |
| 30 | 135 | 14 | 54 | 12 | 351 |
| 35 | 184 | 13 | 74 | 11 | 373 |
| 40 | 240 | 12 | 96 | 10 | 384 |
| 45 | 304 | 11 | 122 | 9 | 385 |
| 50 | 375 | 11 | 150 | 8 | 375 |
| 55 | 454 | 10 | 182 | 6 | 355 |
| 60 | 540 | 9 | 216 | 5 | 324 |

TABLE 1-continued

Power losses in DC motor system

| current (amps) | power lost in Rb (watts) | Vbat & Vmotor (volts) | power lost in Rmotor (watts) | Vemf (volts) | power out of motor (WO) (watts) |
|---|---|---|---|---|---|
| 65 | 634 | 8 | 254 | 4 | 283 |
| 70 | 735 | 8 | 294 | 3 | 231 |
| 75 | 844 | 7 | 338 | 2 | 169 |
| 80 | 960 | 6 | 384 | 1 | 96 |
| 85 | 1084 | 5 | 434 | 0 | 13 |

Referring to Table 1, a maximum power out value of 385 Watts occurs at 45 amps. As current is increased beyond 45 amps, the motor watts out actually falls as more and more energy is converted to heat in Rb and Rm. This peak power out of the motor of 385 watts that occurs at 45 amps is defined as max watts out of the motor, or MWO.

An understanding of MWO having been described, a comparison of the power-to-weight ratios of a corded power tool with the power-to-weight of a conventional cordless power tool system illustrates a dramatic contrast in performance. In an example, a conventional corded hand-held power drill may produce power (MWO) from a universal motor in the range of between 520-600 Watts. The total weight of the drill is approximately 3.3 to 4.3 lbs. This results in a power-to-weight ratio from about 140 Watts/lb to 158 Watts/lb. In comparison, a conventional 12 volt cordless power tool system, such as a cordless drill with attached NiCd battery pack, produces a MWO from the motor at about 225 Watts at a total tool+pack weight of 4.9 lbs (tool weight of about 3.4 lbs; 12V NiCd battery pack weight of about 1.5 lbs). This results in a power-to-weight ratio of about 46 W/lb.

At least two reasons may explain the substantial differences in the power-to-weight ratios between corded power tools and cordless power tool systems. First, the power source (alternating current) in a corded tool does not contribute to the overall weight of the system since it is not a constituent element of the tool. In contrast, the power source in a cordless tool, the battery pack, is one of the largest contributors of weight therein. Second, the motor in a corded power tool is a universal motor operating off alternating current whose field magnetics are generated by relatively lightweight wiring in the armature windings. Cordless systems, in contrast, typically use DC motors with permanent magnet motors that are comparatively heavier than universal motors because the field magnetics are generated by permanent magnets instead of the lighter wires.

Increasing the power and size of conventional battery packs in a cordless power tool is not a realistic solution for narrowing the gap in power-to-weight ratios between corded power tools and cordless power tool systems. Depending on the anticipated use of the cordless tool, the weight of conventional battery packs required to produce power levels in line with corresponding corded tools render the cordless systems ergonomically inefficient, as the cordless tool becomes too heavy to use, especially over extended periods of time.

Conventional battery packs for cordless power tools above 12 volts typically include battery packs having a nickel cadmium ("NiCd") or nickel metal hydride ("NiMH") cell chemistry. As the power output requirements have increased, so has pack weight. A conventional NiCd battery pack capable of delivering 12 volts (or 225 MWO) of power in a cordless tool such as the Heavy-Duty ⅜" 12V Cordless Compact Drill by DEWALT weighs approximately 1.5 lbs, where the weight of the tool and pack is about 4.9 lbs. Thus, almost one-third (31%) of the overall weight of the primarily single-hand use 12V power drill is attributable to the battery pack.

A conventional 18V NiCd battery pack weighs about 2.4 pounds (2.36 lbs.), representing about 46% of the weight of a power tool such as a Heavy Duty, ½", 18V Cordless Drill by DEWALT (total system weight (pack+tool) about 5.2 pounds, various 18V models). A conventional 24V NiCd pack weighs about 3.3 pounds, representing about 38% of the total weight of two-handed power tool such as a Heavy-Duty, ½", 24V Cordless Hammerdrill by DEWALT, Model DW006 (total system weight of about 8.7 pounds).

Thus, increasing the overall weight of the cordless power tool by adding battery packs capable of supplying higher power levels also may negatively influence the ergonomic aspects of the tool by increasing its overall weight beyond acceptable levels. With NiCd and NiMH power sources, higher power means substantially heavier battery packs. The corresponding increases in overall weight of the cordless tool make the tool more difficult to manipulate and/or use over extended periods. For example, the weight of a 24 volt NiCd battery pack (about 3.3 lbs) represents over a 100 percent increase in weight as compared to the weight of a 12 volt NiCd battery pack (1.5 lbs).

The additional weight associated with heavier battery packs may also adversely affect the overall balance of the cordless tool and its ergonomic qualities. Battery packs are traditionally attached to a cordless drill at the distal end of a grip (such as at the bottom of the tool) or near the rear portion of the tool, such as for a cordless circular saw. As voltages increase and the battery pack becomes heavier, the pack weight is leveraged against the remainder of the cordless tool system, potentially making the tool harder to control and use.

SUMMARY OF THE INVENTION

An example embodiment of the present invention is directed to a cordless power tool system for improved power output. The system includes a plurality of hand-held cordless power tools, where each power tool includes a tool housing, motor assembly, transmission/gear assembly and removable battery pack. The battery pack provides a nominal output voltage of approximately 25 volts or greater to a DC motor of the motor assembly. Each of the hand-held cordless power tools of the system has a power output to weight ratio of 70 watts per pound (W/lb) or greater.

BRIEF DESCRIPTION OF THE DRAWINGS

The example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

As used herein, power tools may be occasionally characterized and/or classified by the terms "primarily single-handed use" or "single-hand", "primarily two-handed use" or "two-hand" and "primarily supported-use" or "supported-use". A single-hand cordless power tool may be understood as a power tool typically used with one hand. A two-hand tool may be understood as a power tool typically used with both hands. A supported-use tool may be understood as a power tool requiring a support surface for proper operation, for example, i.e., a tool that may be operated against or across a supporting surface. These classifications are not intended to be inclusive of all power tools in which the example embodiments of the present invention may be applied, but are only illustrative.

Example primarily single-handed power tools may include, but are not limited to: drills (drill drivers), impact wrenches, flashlights, single-handed metal working tools such as shears, etc. Example primarily two-handed power tools may include, but are not limited to: reciprocating saws, two-handed drills such as rotary and demolition hammer-drills, angle grinders, cut-off tools, and drill drivers having a handle grip and an extendible side handle, etc. Some of these tools may currently be commercially available only in a corded version, but may become cordless with the use of light-weight portable power sources to be described herein, such as Li-ion battery packs that may provide power in the cordless version commensurate with its corded counterpart. A cordless flashlight powered by a plurality of Li-ion cells can be a single-handed or two-handed power tool, for example, depending on the size and/or length of the flashlight.

Example primarily supported-use tools may include, but are not limited to: circular saws, jigsaws, routers, planers, belt sanders, cut-out tools, plate joiners, etc. Some of these tools may currently be commercially available only in a corded version, but may become cordless with the use of light weight portable power sources such as Li-ion battery packs.

Additionally as used herein, the term "power-to-weight ratio" may be defined as the maximum power output from a motor of a given power tool divided by the total system weight of the tool (system weight=weight of tool and battery pack for cordless power tools; weight of the tool for corded tools). Where used, the term "high power" as applied to a removable power source or battery pack refers to power sources for cordless power tools that are at least 18 Volts and/or tool motors of cordless power tools that have a maximum power output (maximum watts out (MWO)) of at least 385 Watts.

Figure 1:
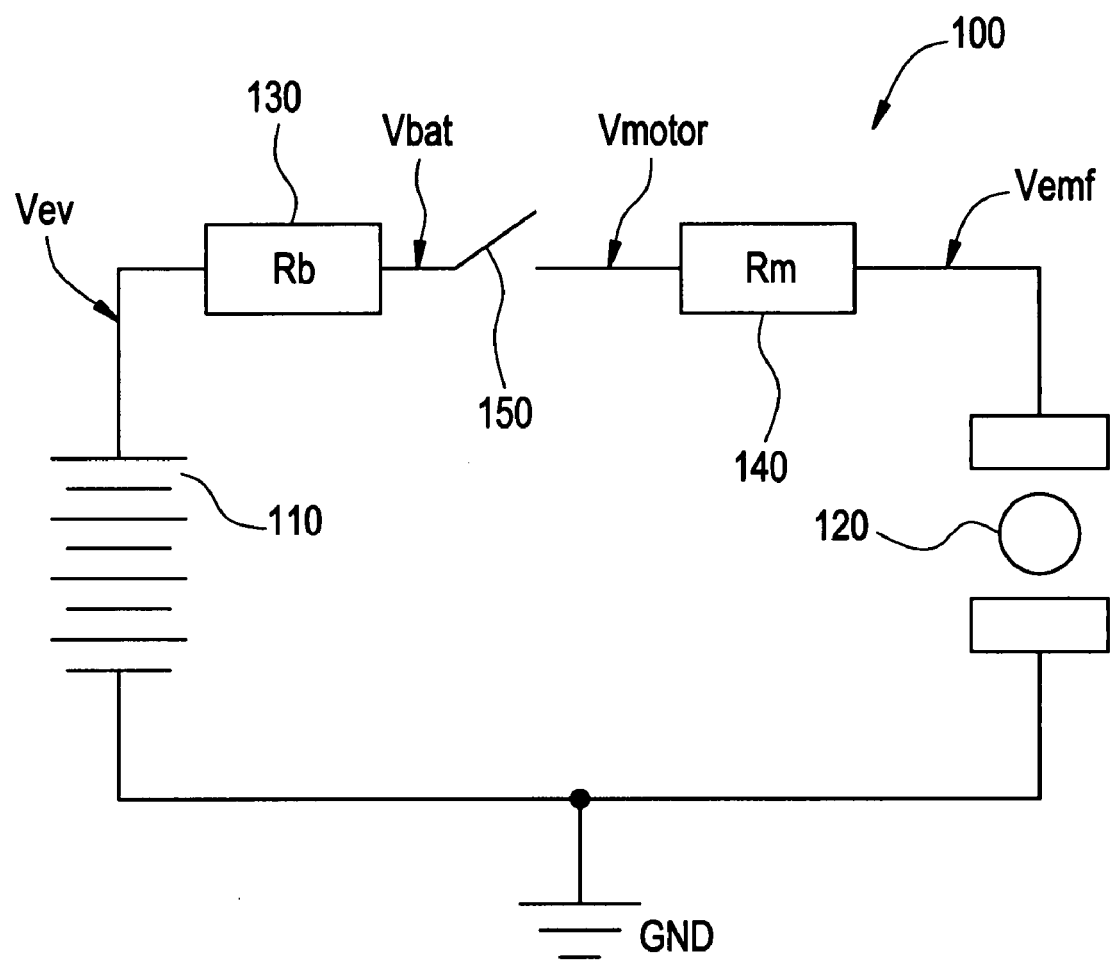
FIG. 1 is a block diagram of a generic cordless system to describe power losses between the battery source and the motor output.
Figure 2:
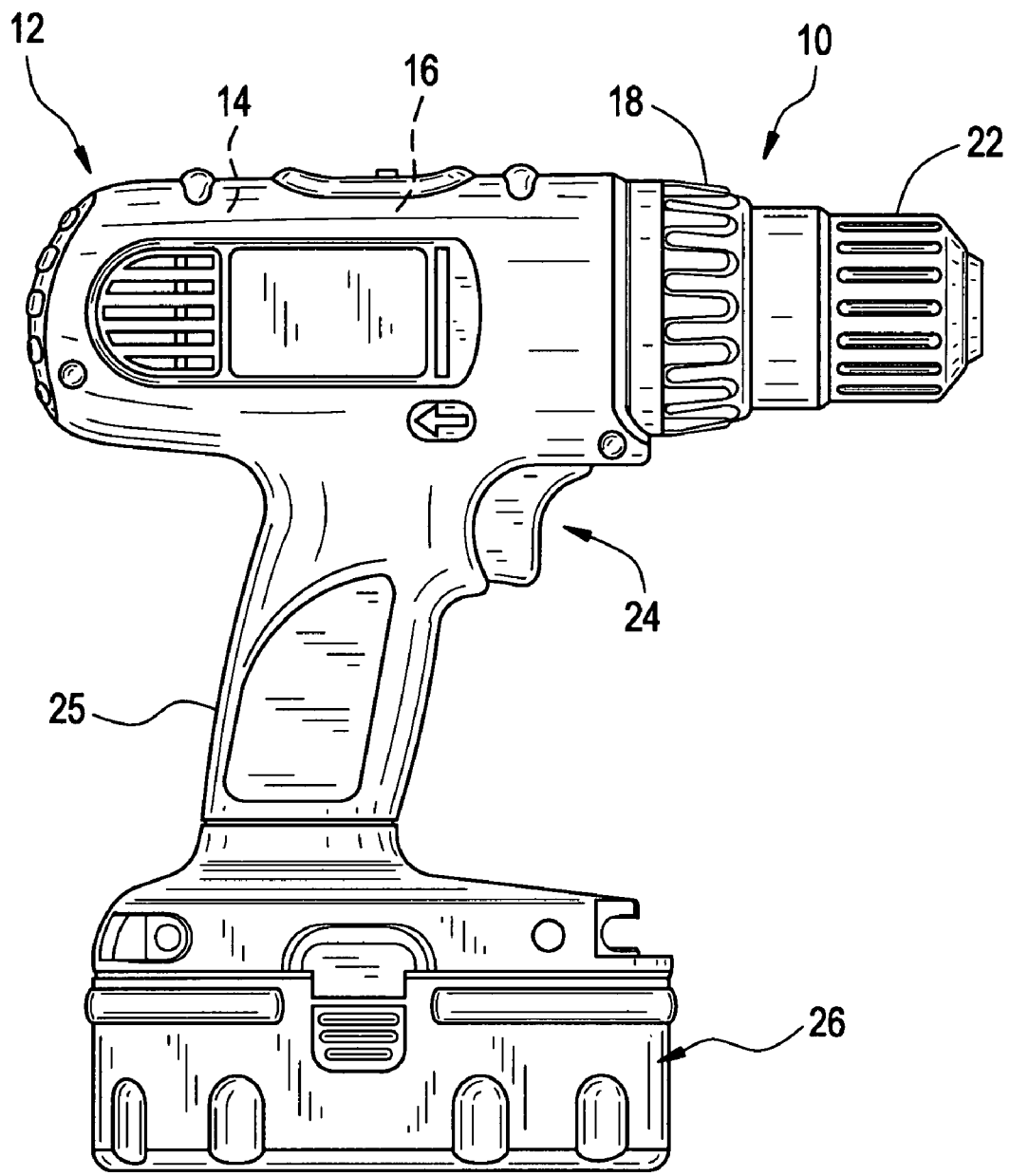
FIG. 2 is a side view of a cordless primarily single-hand use cordless power tool according to an example embodiment of the present invention.

FIG. 2 is a side view of a cordless primarily single-hand use cordless power tool according to an example embodiment of the present invention. Referring to FIG. 2, an example single-hand cordless power tool may be generally indicated by reference numeral 10 which designates a drill, and may include a housing 12, a motor assembly 14, a multi-speed transmission assembly 16, a clutch mechanism 18, a chuck 22, a trigger assembly 24, handle 25 and a battery pack 26. Battery pack 26 may be a rechargeable high power battery pack, such as Li-ion or other high power source, comprised of one or a plurality of cells, for example. Power tool 10 has a single gripping area as shown in FIG. 2 and is designed to be operated by one hand.

In one exemplary embodiment, the cells may be Li-ion having one or more of a lithium metal oxide cell chemistry, a lithium-ion phosphate (LPF) cell chemistry and/or another lithium-based chemistry makeup, for example, in terms of the active components in the positive electrode (cathode) material. As examples, the active material in the cathode of the cell with a metal oxide chemistry may be one of lithiated cobalt oxide, lithiated nickel oxide, lithiated manganese oxide spinel, and mixtures of same or other lithiated metal oxides. The active component in the cathode of a cell having LPF chemistry is lithiated metal phosphate, as another example. These cells may be cylindrically shaped and have a spiral wound or "jelly roll" construction as to the cathode, separators and anode, as is known in the battery cell art. The material of the negative electrode may be a graphitic carbon material on a copper collector or other known anode material, as is known in the Li-ion battery cell art.

Those skilled in the art will understand that several of the components of the power tool 10, such as the chuck 22 and the trigger assembly 24, are conventional in nature and therefore need not be discussed in significant detail in the present application. Reference may be made to a variety of publications for a more complete understanding of the conventional features of the power tool 10. One example of such a publication is U.S. Pat. No. 5,897,454, the disclosure of which is hereby incorporated by reference in its entirety. Another example single-handed use power tool which includes these conventional components is the Heavy Duty 18V Drill driver by DEWALT, Model DC759KA, which has a single gripping surface on the handle and is designed to be operated by one hand.

Figure 3:
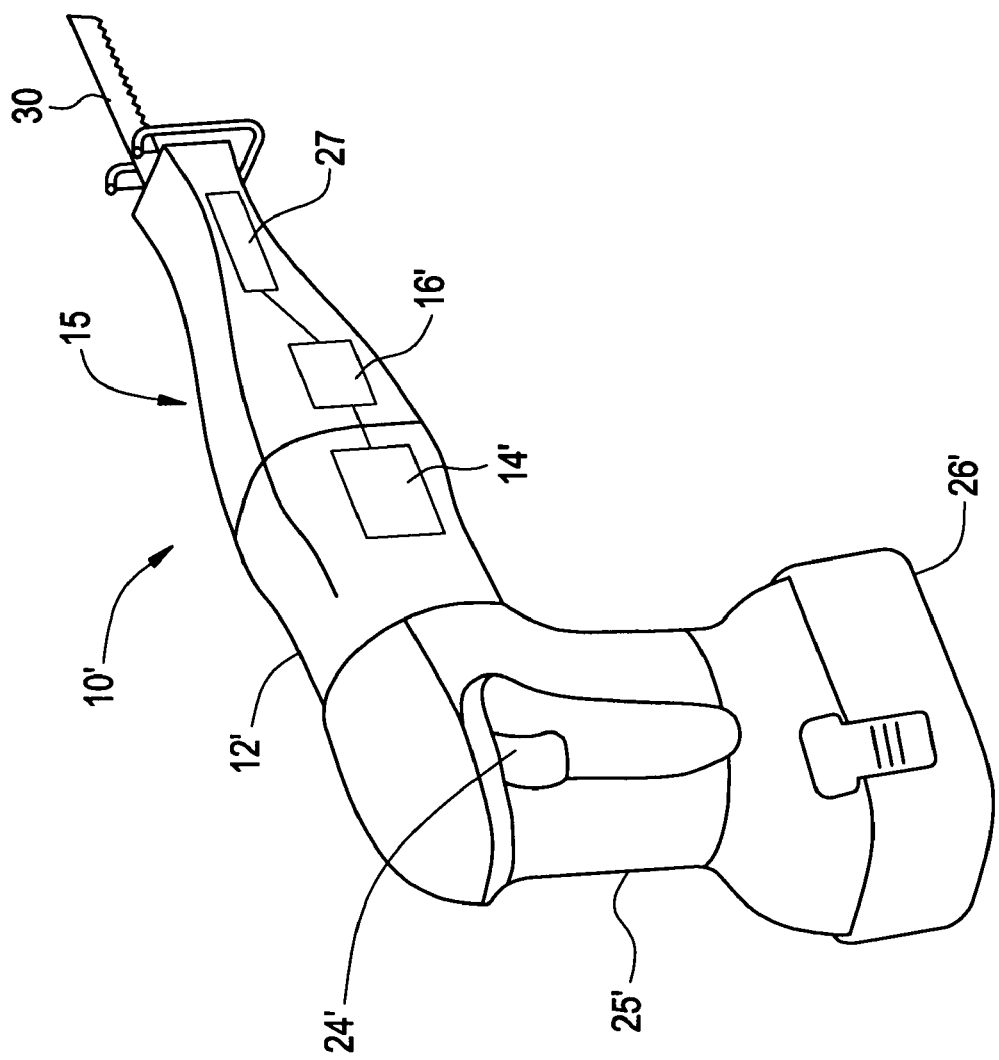
FIG. 3 is a side view of a cordless primarily two-handed use cordless power tool according to an example embodiment of the present invention.

FIG. 3 is a side view of a cordless, primarily two-handed use cordless power tool according to an example embodiment of the present invention. Referring to FIG. 3, an example two-hand cordless power tool may be generally indicated by reference numeral 10' which designates an example cordless reciprocating saw. Tool 10' may include a housing 12', a motor assembly 14', a multi-speed gear train (transmission)

assembly 16', a trigger assembly 24', handle 25', output shaft (generally designated at 27) and a saw blade 30. The tool 10' is primarily designed for two-hand use, gripping tool at handle 25' and on stock 15 of housing enclosing transmission/gearing 16'. The tool 10' also includes a separate and removable battery pack 26'. Battery pack 26' may be a rechargeable high power battery pack, such as a Li-ion pack comprised of one or a plurality of cells, for example. Those skilled in the art will understand that several of the components are conventional in nature and thus a detailed explanation is omitted for purposes of brevity. An example two-hand use power tool which includes these conventional components is the Heavy Duty 18V Cordless Reciprocating Saw by DEWALT, Model DC385K. This tool includes two gripping surfaces and is designed to be operated using two-hands.

Figure 4:
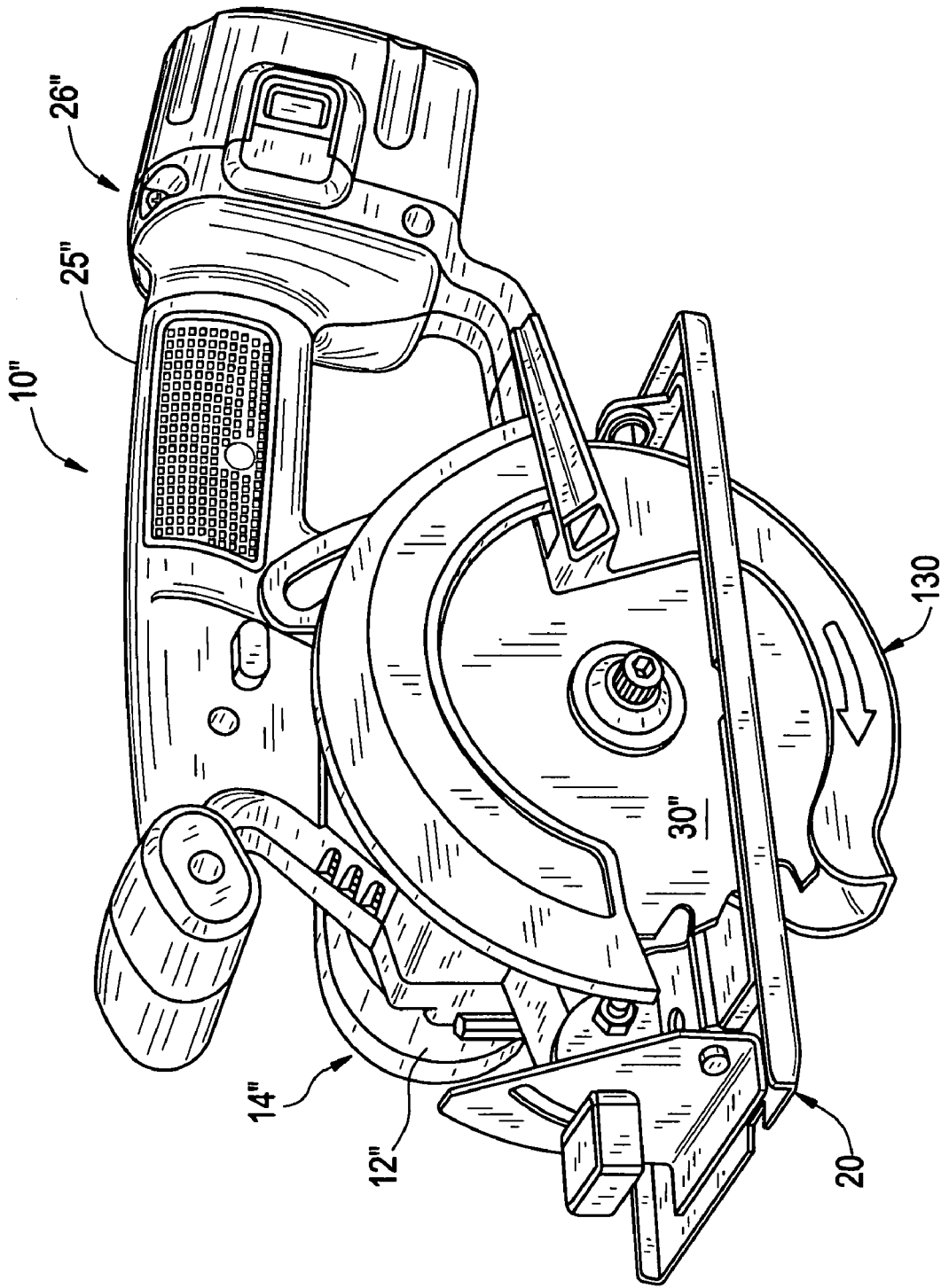
FIG. 4 is a perspective view of a primarily supported-use cordless power tool according to an example embodiment of the present invention.

FIG. 4 is a perspective view of a primarily supported-use cordless power tool according to an example embodiment of the present invention. Referring to FIG. 4, an example supported-use cordless power tool may be generally indicated by reference numeral 10" which designates an example cordless circular saw. Tool 10" includes a saw blade 30', at least partially enclosed by a blade guard 130. The saw blade 30' and blade guard 130 protrude through and opening in a guide assembly 20. Saw blade 30" is driven by a motor 14". The motor 14" is covered by a housing 12".

The tool 10" may also have a battery pack 26" connected to the motor 14". The battery pack 26" may be mounted on distal end of tool handle 25" in a manner that does not interfere with the sawing action of the saw blade 30". Battery pack 26" may be a rechargeable high power battery pack, such as Li-ion, comprised of one or a plurality of cells, for example.

Those skilled in the art will understand that several of the components of the power tool 10' are conventional in nature and thus a detailed explanation is omitted for purposes of brevity. An example supported-use power tool which includes these conventional components is the Heavy-Duty XRP™ 18V Cordless Circular Saw by DEWALT, MODEL DC390K, for example.

Several parameters or technical aspects or features should be considered in the design of a cordless power tool. For example, the power of the tool, its size, the total system weight (i.e., weight of tool with attached battery pack), the cycle life of the battery pack, the cost of the constituent components of the tool, the temperature at which the tool (in combination with the battery pack) may be stored and/or operated may all represent relevant considerations in selecting the appropriate constituents elements of a tool for maximizing and/or obtaining desired tool performance. At least some of these considerations should be weighed against each other in an effort to achieve an ergonomic design which supports enhanced performance of a cordless power tool system.

One consideration in creating an ergonomically efficient cordless power tool is the total system weight, or cumulative weight of the tool with battery pack, occasionally referred to herein as "cordless tool system" or "system" for purposes of brevity and/or clarity. The cumulative weight of the system may include the weights of four constituent weight groups in the system: (1) the power source (battery pack), (2) the transmission (and gears), (3) the housing and supporting infrastructure, and (4) the motor.

Figure 5:
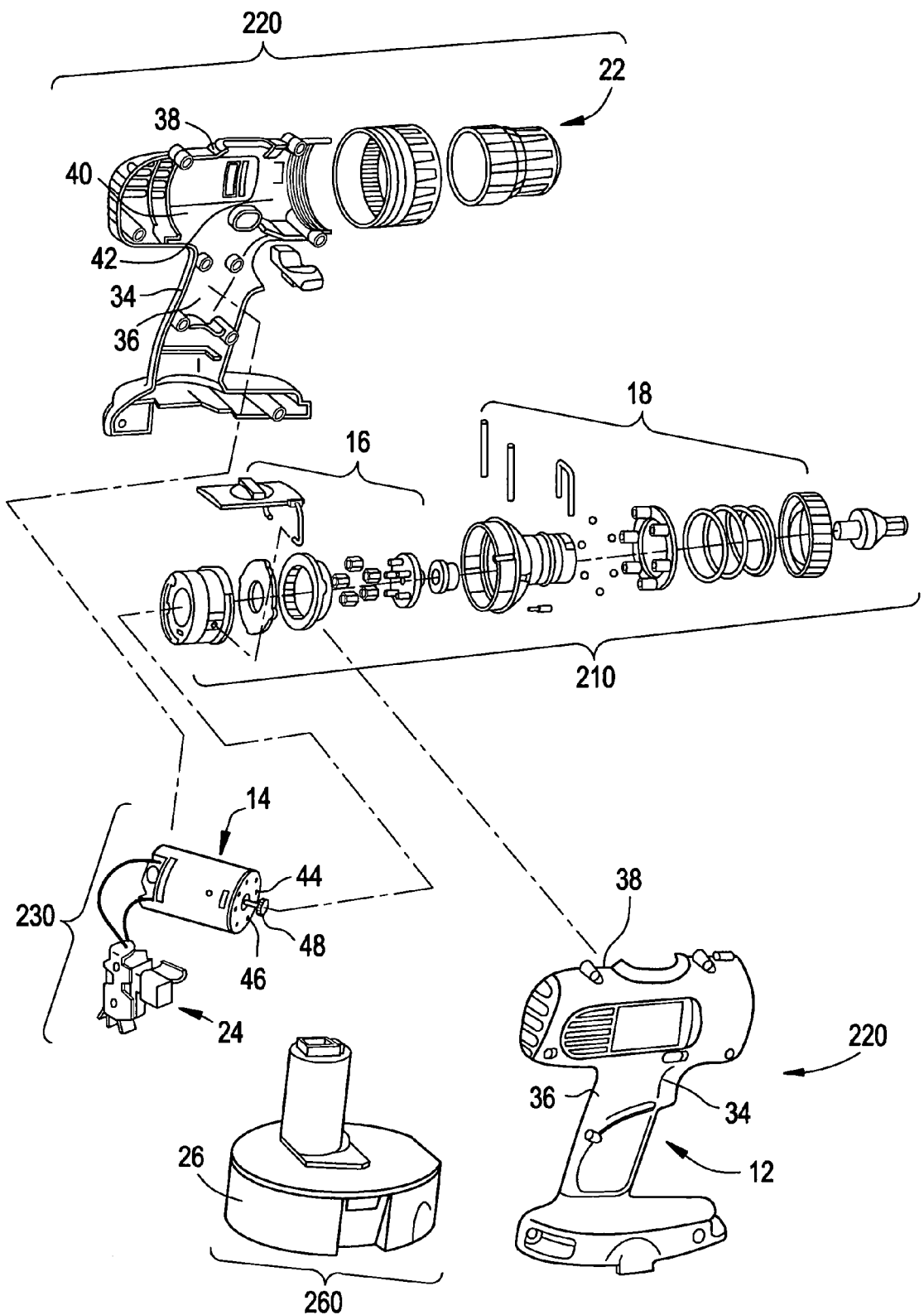
FIG. 5 is an exploded view of the single-hand cordless power tool of FIG. 1.

FIG. 5 is an exploded view of a cordless primarily single-hand use cordless power tool of FIG. 2 according to an example embodiment of the present invention. FIG. 5 illustrates the four primary (4) weight contributing elements or groups that should be evaluated in determining the overall weight of a cordless tool, so as to achieve a desired power-to-weight ratio. The four weight contributing groups may include: (1) the power source 260 (i.e., battery pack 26); (2) the transmission and gears 210; (3); the housing 220 and other infrastructure; and (4) the motor assembly 230. It is evident to those skilled in the art that the primary two-hand cordless power tool embodiments as shown in FIG. 3 and the primarily supported-use cordless power tools shown in the example FIG. 4 may also be broken down into the above four (4) weight contributing groups; thus exploded views of FIGS. 3 and 4 are omitted for purposes of brevity herein.

The power source 260 represents the heaviest single element in the primarily single-hand use tool. For example, a NiCd battery pack may constitute over one-third of the weight of the overall tool in an 18 volt power tool system. A conventional 18V NiCd pack weighs approximately 2.4 lbs. with the combined overall weight of a single-hand cordless tool system, such as the example 18V power drill, being approximately 6 lbs.

The transmission and gears 210 (inclusive of transmission 16 and clutch mechanism 18 with their constituent elements) may typically be the second largest contributor of weight in the cordless power tool. In a conventional 18V NiCd cordless tool system such as the power drill shown in FIG. 2, the transmission elements and gear/clutch elements collectively weigh about 2 lbs, which is about ⅓ of the overall weight of the tool.

A third primary weight group is the housing and infrastructure (inclusive of the housing 12 and chuck 22) that supports the motor assembly group 230, battery pack (shown as group 260 in FIG. 5) and transmission/gears group 210. The housing 220 may include a pair of mating handle shells 34 that cooperate to define a handle portion 36 and a drive train or body portion 38. The body portion 38 may include a motor cavity 40 and a transmission cavity 42. In this example, housing 220 may collectively weigh between about 0.6 to 1.0 pound The motor assembly 230 and related parts may constitute a fourth primary weight group. In this example, the motor assembly group 230 is housed in the motor cavity 40 and includes a motor 14 with rotatable output shaft 44, which extends into the transmission cavity 42. A motor pinion 46 having a plurality of gear teeth 48 is coupled for rotation with the output shaft 44. The trigger assembly 24 and battery pack 26 cooperate to selectively provide electric power to the motor assembly 230 in a manner that is generally well known in the art so as to permit the user of the power tool 10 to control the speed and direction with which the output shaft 44 rotates.

Permanent magnet ("PM") motors used in cordless power tools are well known to one of ordinary skill in the art. In comparison with corded systems that use universal motors, PM motors are, comparatively, significantly heavier since power is converted to electromotive force using permanent magnets to generate the field magnetics. Accordingly, the approximate total weight of the motor assembly group 230 may be about 1.0 lbs.

Figure 6A:
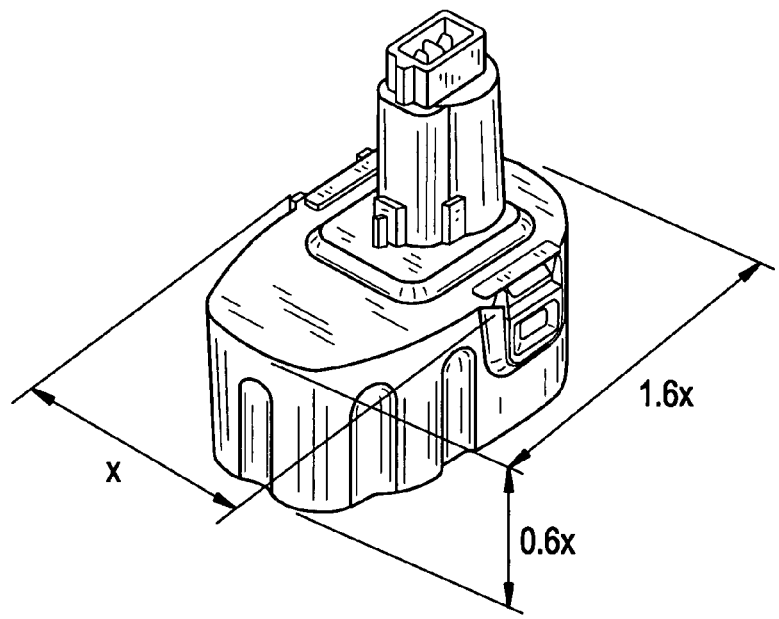
FIGS. 6A-6C illustrate battery pack dimensions for a conventional 18V NiCd battery pack and two example Li-ion battery packs in accordance with an example embodiment of the present invention.
Figure 6B:
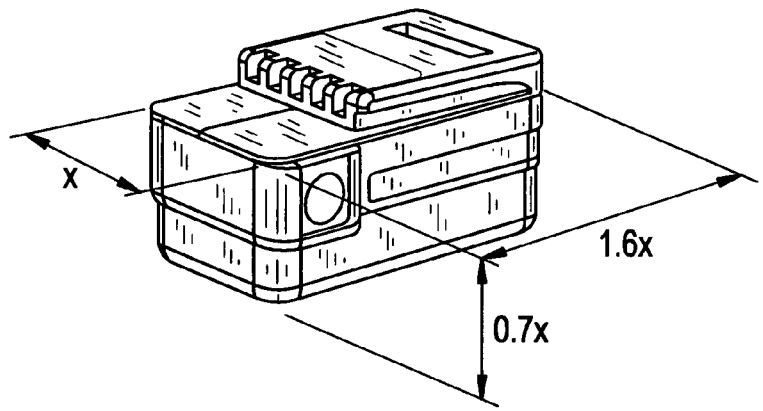
Figure 6C:
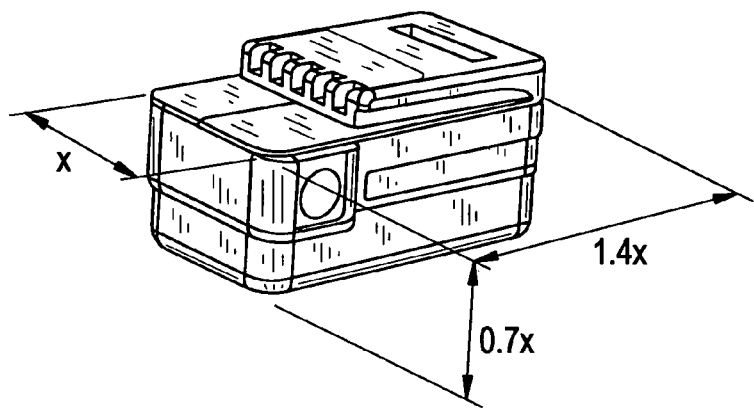

FIGS. 6A-6C illustrate battery pack dimensions for a conventional 18V NiCd battery pack and two example Li-ion battery packs in accordance with an example embodiment of the present invention. One of the considerations for designing an ergonomically efficient tool is size. FIG. 6A shows the dimensions of a conventional 18V NiCd battery pack. The high power Li-ion battery pack, which may represent any of pack 26, 26' and/or 26" may be consistent with size requirements of the conventional battery pack it is intended to replace, although the housing size may be even smaller than the housings for at least the conventional 18V and/or 24V NiCd or NiMH packs.

Accordingly, FIG. 6B illustrates the dimensions of an example 36V Li-ion pack that is consistent with the dimensions of the conventional 18V NiCd pack of FIG. 6A. FIG. 6C illustrates the dimensions of a 25.2V Li-ion pack that is consistent with the dimensions of the conventional 18V NiCd pack of FIG. 6A. Although the packs of FIGS. 6B and 6C are shown for approximately 36V and 25.2V packs, the construction and dimensions could apply to differently rated Li-ion packs, for example. The pack voltage of the Li-ion battery packs shown in FIGS. 6B and/or 6C is at least about 18V. In another example, the packs of FIGS. 6B and 6C can provide a nominal voltage of approximately 28 V.

Figure 7B:
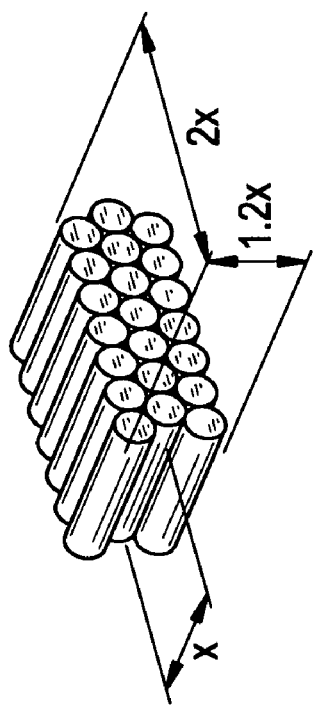
FIGS. 7A and 7B illustrate example cell configurations for a 36V Li-ion pack in accordance with an example embodiment of the present invention.
Figure 7A:
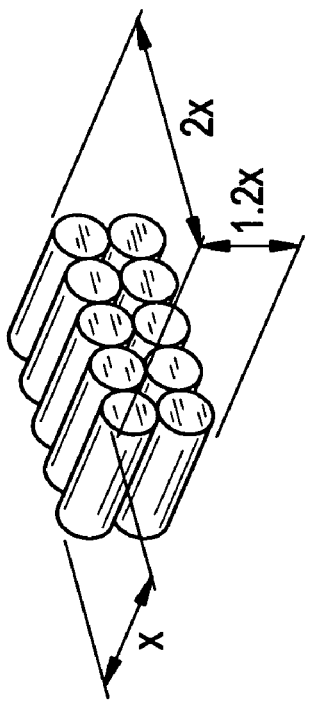

FIGS. 7A and 7B illustrate example cell configurations for a 36V Li-ion pack in accordance with an example embodiment of the present invention. In particular, FIGS. 7A and 7B illustrate alternative cell constructions for the 36V pack shown in FIG. 6B.

Referring to FIG. 7A, the cell arrangement within the pack of FIG. 6B may a plurality of 26650 Li-ion cells (each cell 26 mm in diameter and 65 mm in length) in the illustrated cell orientation. FIG. 7A illustrates ten (10) 26650 cells, having a nominal cell voltage of about 3.6 V/cell. Alternatively, the cell arrangement within the pack of FIG. 6B may comprise twenty (20)18650 Li-ion cells (each cell 18 mm in diameter and 65 mm in length) in the illustrated cell orientation of FIG. 7B. FIG. 7B shows three strings of cells which in a parallel combination with a nominal cell voltage of about 3.6 V/cell, so as to achieve a pack voltage of 36V. The pack voltage is approximately 36 V, as volts per cell may vary due to specific chemistry of the lithium-ion cells within the pack. For example, a cell having a lithium metal phosphate based-cell chemistry is about 3.3 V/cell nominally, where a cell having a lithium metal oxide based cell chemistry is about 3.6 V/cell nominally.

Figure 8B:
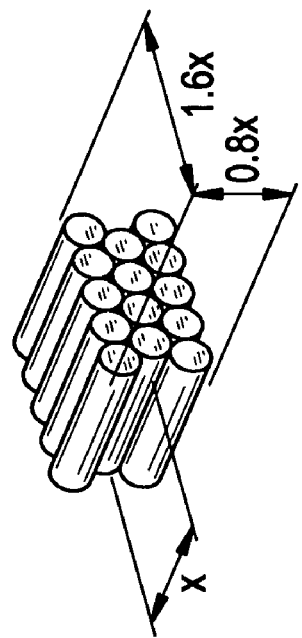
FIGS. 8A and 8B illustrate example cell configurations for a 25.2 Li-ion pack in accordance with an example embodiment of the present invention.
Figure 8A:
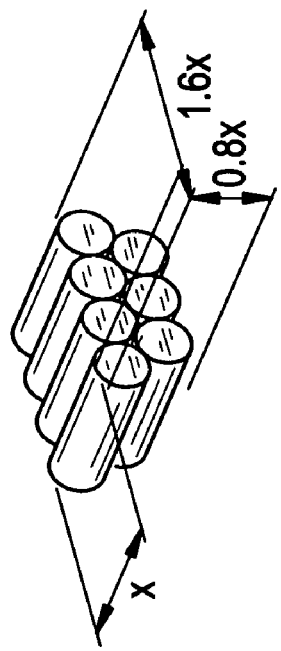

FIGS. 8A and 8B illustrate example cell configurations for a 25.2 Li-ion pack in accordance with an example embodiment of the present invention. In particular, FIGS. 8A and 8B illustrate alternative cell constructions for the 25.2V pack shown in FIG. 6C. Referring to FIG. 8A, the cell arrangement within the pack of FIG. 6C may comprise seven (7) 26650 Li-ion cells in the illustrated cell orientation. Alternatively, the cell arrangement within the pack of FIG. 8B may comprise fourteen (14) 18650 Li-ion cells in the illustrated cell orientation. The nominal voltage for the battery pack is thus approximately 25 V, as volts per cell may vary slightly due to specific chemistry of the lithium-ion cells within the pack, as described above.

Volts per cell and the number of cells for the orientation shown in FIGS. 7A-8B may be tailored to the desired total power required of the high power Li-ion battery pack, and may be in a nominal voltage range of about 3.3 to 4.6 V/cell, which may present an acceptable range based on industry electrochemical voltage potential guidelines. Of course these values may vary depending on the charge state of the cells (whether cells are fully charged or not), and on the particular chemistry of the cells.

The total pack weight of the 36 V Li-ion battery pack shown in FIG. 6B, with cell orientations of FIGS. 7A and/or 7B may be in a range of about 2.4-2.9 pounds. In another example, the weight range may be between about 2.36-2.91 pounds, the pack weight varying depending on the particular manufacturer of the cells and/or pack. The total pack weight of the 25.2V Li-ion battery pack shown in FIG. 6C, with cell orientations of FIGS. 8A and 8B may be in a range of about 2.0 to 2.4 pounds. In another example, the weight range may be between about 1.88-2.17 pounds, and varies depending on the particular manufacturer of the cells and/or pack. The weight ranges for the 25.2 V and 36V packs may vary based on several factors, including whether or not the cell casings are made of steel or aluminum, thickness and/or materials comprising the outer housing of the packs, weights of the associated electrodes and/or heat sinks in the pack, etc.

In an additional example, the high power Li-ion battery packs 26, 26' and/or 26" shown in FIGS. 2-4 can be embodied as a battery pack having a plurality of cells with a lithium-based chemistry that are configured to provide a nominal voltage of approximately 28V to a motor of a cordless power tool. The 28V Li-ion battery pack may have a total pack weight in a range between about 1.9 to 2.1 pounds and in a specific example weighs 2.02 pounds. The 28V battery pack includes an additional cell as compared to the configuration shown for the 25.2V battery pack of FIG. 8A. Thus, the cell arrangement within the 28V Li-ion battery pack comprises eight (8) 26650 Li-ion cells serially connected, at about 3.6 V/cell for a total nominal voltage of approximately 28V. Volts per cell may vary slightly due to specific chemistry of the lithium-ion cells within the battery pack, as described above.

Figure 9:
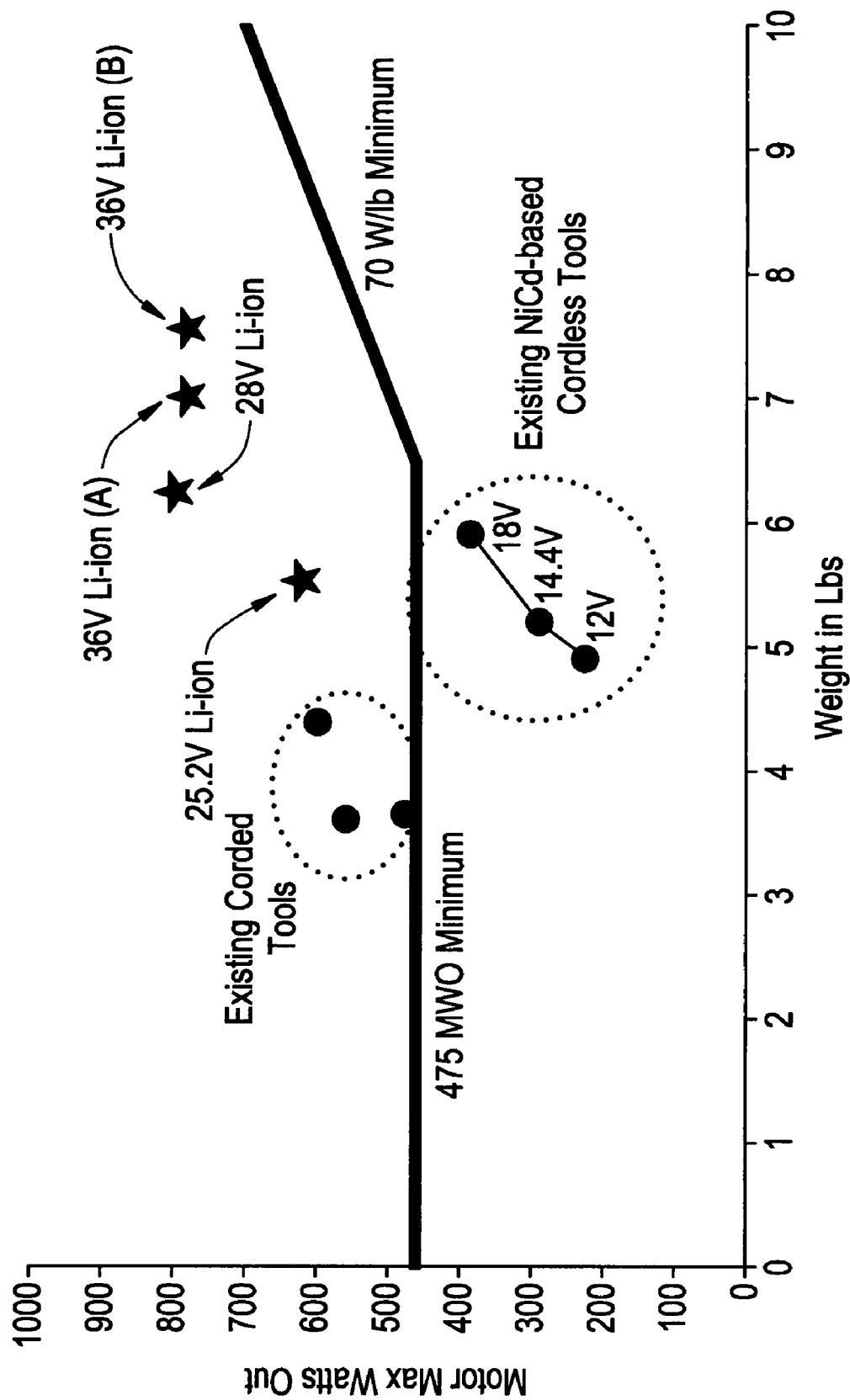
FIG. 9 is a graph of maximum power out versus tool weight for a cordless single-hand power tool with conventional battery pack, a single-hand corded power tool, and a cordless single-hand power tool with Li-ion battery pack according to an example embodiment of the present invention.

FIG. 9 is a graph of power out versus tool weight for a cordless single-hand power tool with conventional battery pack, a single-hand corded power tool, and a cordless single-hand power tool with Li-ion battery pack according to an example embodiment of the present invention. Referring to FIG. 9, the y-axis illustrates maximum watts out (MWO) of the tool, and the x-axis denotes weight (in pounds) of the tool (corded) or tool with battery pack (cordless system).

With respect to conventional cordless power tools, a conventional 12 volt NiCd battery pack weighs approximately 1.5 lbs. In contrast, a 14.4 volt NiCd battery pack weighs approximately 2.0 lbs., an 18 volt NiCd pack weighs approximately 2.4 lbs., and a 24 volt NiCd pack weighs approximately 3.3 lbs. As power increases, the number of NiCd cells required in the pack also may significantly increase, rendering the tool more ergonomically inefficient for voltages above 18 volts, primarily due to the added weight.

Figure 10:
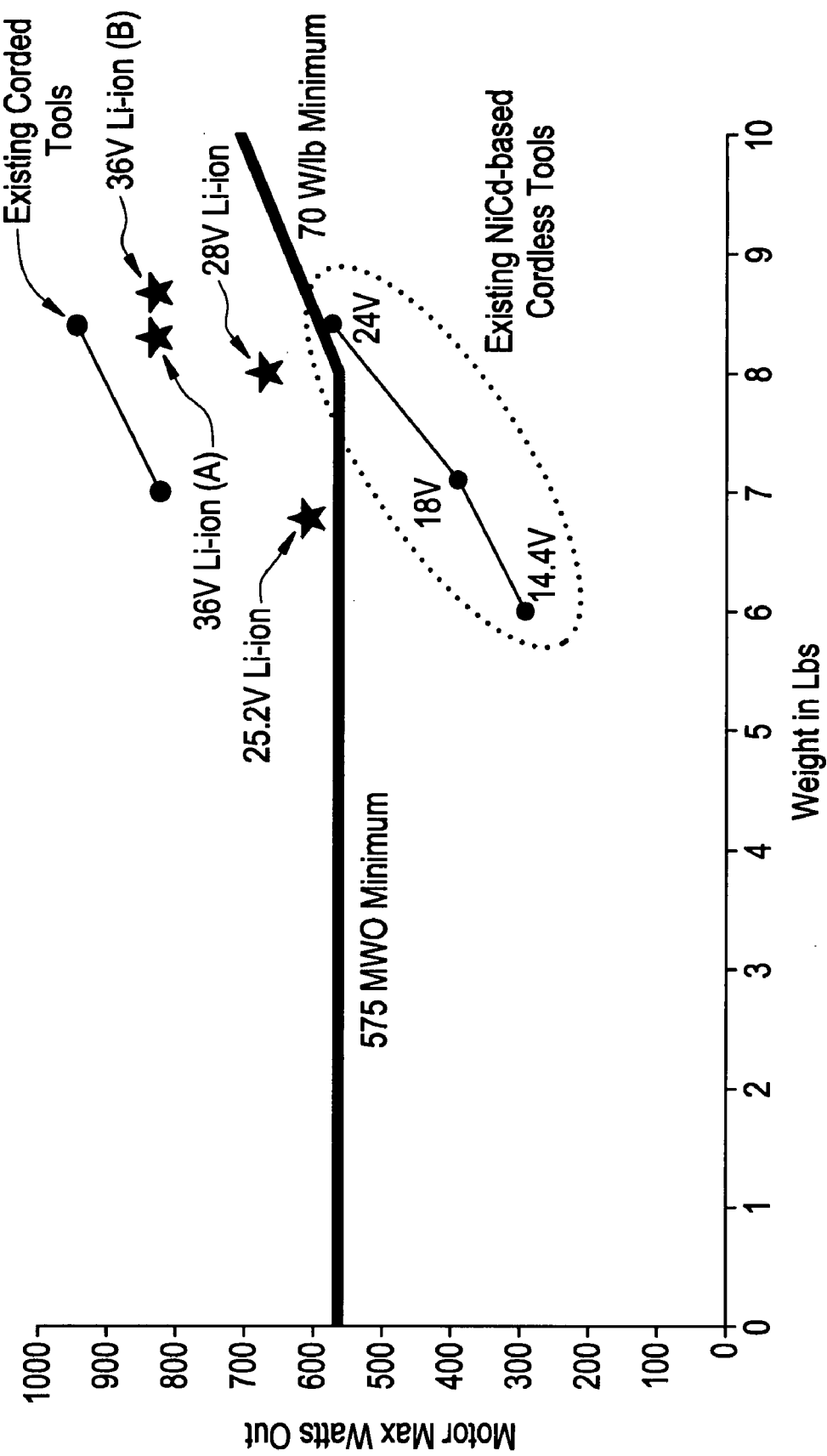
FIG. 10 is a graph of maximum power out versus tool weight for a cordless two-hand power tool with conventional battery pack, a two-hand corded power tool, and a cordless two-hand power tool with Li-ion battery pack according to an example embodiment of the present invention.
Figure 11:
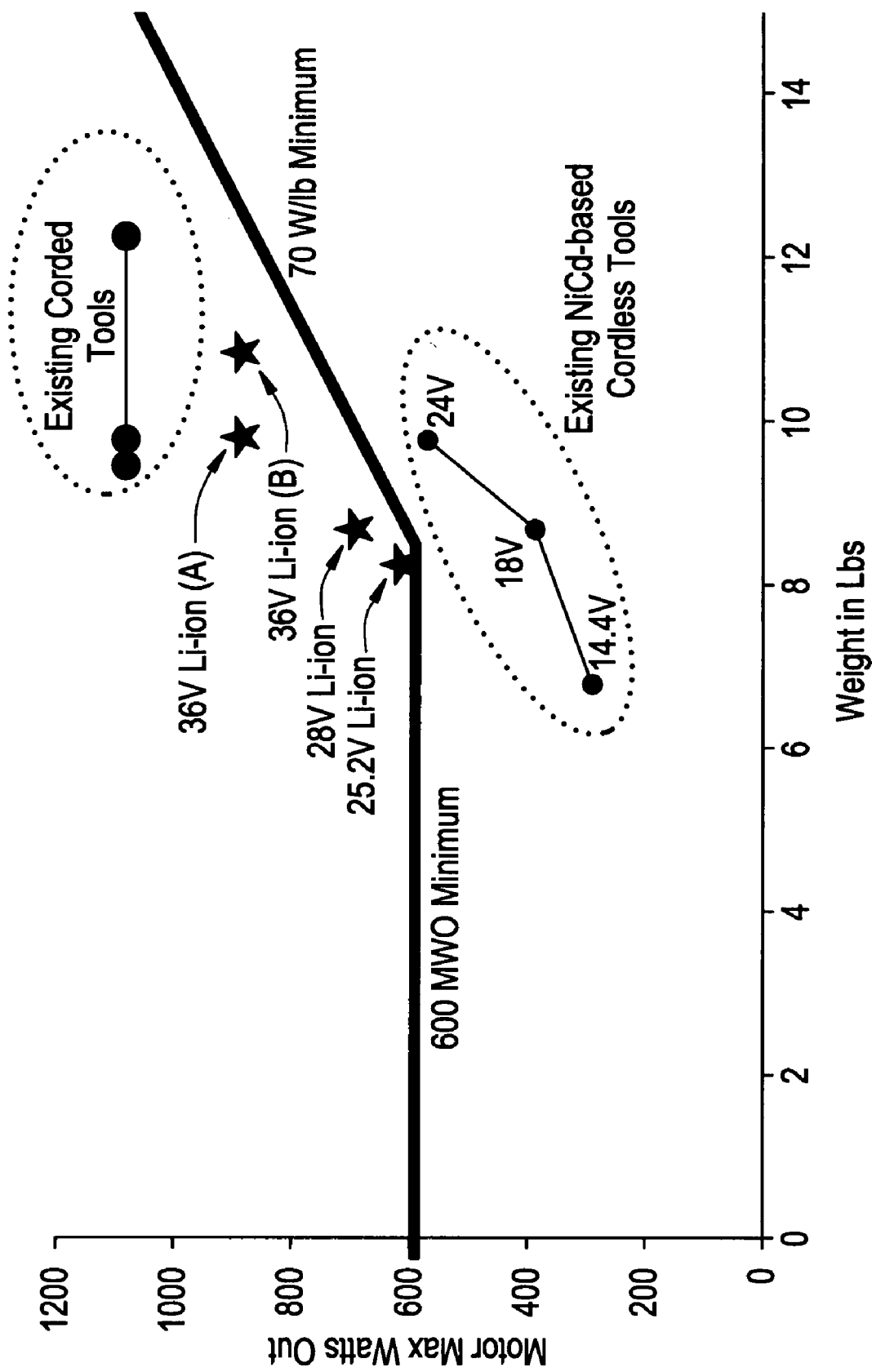
FIG. 11 is a graph of maximum power out versus tool weight for a cordless, supported-use power tool with conventional battery pack, a supported-use corded power tool, and a cordless, supported-use power tool with Li-ion battery pack according to an example embodiment of the present invention.

As will be shown in FIGS. 9-11 hereafter, the example embodiments of the present invention are directed to a cordless power tool system configured to output a maximum power output (MWO) of at least about 475 watts, and where the cordless power tool system has a maximum power output to weight ratio of at least about 70 watts per pound (W/lb). A system of cordless power tools may be embodied as one or more of the example embodiments shown in any of FIGS. 2-4, and equivalents for single, two-hand and supported-use tools. The cordless power tools of the system may be comprised of, at least, a tool housing, a motor assembly, some type of transmission/gear assembly, and a power source such as a battery pack, which may represent the primary contributors to the overall weight of the tool.

In an example, the combined system weight (cordless tool+pack) may be at least about 4 pounds, and may exceed 10 pounds for some supported-use cordless tools. Example tool system weight for single-hand cordless tool system and powered by a battery pack between about 25 to 36V may be between about 5.5 to 7.5 lbs. For a two-handed tool system, the weight range may be between about 6.5 to 10 pounds. These weight ranges exemplify reasonably ergonomically acceptable weights to both the corded and cordless tool user for various single and two-handed power tool systems. Supported-use cordless tool system weights may be at least about 8 pounds, but may exceed 10 pounds for some tool systems, as part of the weight of tools in this tool system is supported (e.g., circular saw, jigsaw). In another example, as supported by Tables 2-4 to be described below, the combined system weight of a cordless power tool with a high power battery pack, such as Li-ion, in accordance with the example embodiments may be between about 5.5 to about 10.4 pounds, for example.

In another example in which the system of cordless power tools is configured to include a Li-ion battery pack having a nominal voltage of 28V, the total system weight is at least about 6.2 pounds, with an example range of weight for a given power tool configured with a 28 V Li-ion battery pack being between about 6.2 to 8.7 pounds. A cordless power tool configured with a 28V Li-ion battery pack has an exemplary maximum watts out (MWO) range between about 500 to 900 watts, and in another example has a MWO range between about 680 to 800 watts.

To illustrate the advantages of employing high-powered battery packs, such as Li-ion, in cordless power tools, a comparison was made between single-hand use power tools with conventional NiCd battery packs, corded, single-hand use tools, and single-hand use power tools configured with high power Li-ion battery packs in accordance with the example embodiments of the invention. Table 2 illustrates the data evaluated in order to generate the graph in FIG. 9. The data for corded and conventional cordless tools was taken from existing models of DEWALT cordless and AC corded power drills. Tool-only and battery-only weights are shown for selected models for comparison purposes.

Table 2 below denotes nominal voltage ratings, the model number for selected cordless and corded tools, the total tool system weight (weight of tool+battery pack), the MWO and the power-to-weight ratios of these single-hand use power drills. Power drills (also known as drill drivers) are an example of a single-hand use cordless power tool.

For the 25.2V Li-ion pack in the example cordless power tool system embodiments, the tool alone weight is 3.54 pounds, which is the same as the DEWALT Model DC987 18V cordless drill. The drill configured with the 28V battery pack had a battery pack alone weight of 2.02 pounds and a system weight of 6.2 pounds.

An example 36V cordless power drill was analyzed with two different 36V Li-ion packs. Tool weight of the drill was 4.53 pounds empty, 36V Li-ion Pack "A" weighed 2.4 pounds and 36V Li-ion Pack "B" weighed 2.91 lbs. The difference in weights between pack A and pack B were attributed to the cell construction of the Li-ion cells within the battery packs.

The MWO in Table 2 for the 25.2V, 28V and 36.0V Li-ion powered, cordless power tool embodiments (608W, 800 W and 775 W) is based on a maximum current limit set for the battery pack. The current limit used for the determination was set at 30 A.

In general, cordless power tool products typically do not have a current limit set in the battery pack to protect the tool internal components. Components in the tool motor, housing, gearing, etc. are typically configured to withstand the maximum current the pack is rated for. However, if a current limit is set in the pack, as is the case in the example embodiments, this may allow the use of lighter materials and subsystem components, e.g., motors, housings, gears, etc., so as to realize ergonomic benefits in the cordless power tool system.

The example current limit of 30 A out of the battery pack which is a current value that is consistent with maintaining the motor and gear elements sufficiently small and lightweight, at least equal in weight to the counterpart components in the conventional cordless models. This example current limit, which may also serve as a power limit, i.e. a function of voltage and current, may act as a restriction to avoid damage to the tool motor and associated gearing, due to excessive currents being generated from the example Li-ion battery packs. The 30 A current limit is merely an example; the current limit may be variable and can be adjusted based on the particular tool system's ability to withstand higher power levels (e.g., the tool system's mechanical components' ability to handle mechanical and thermal stresses imposed by higher current). For example, the current limit could be set at 40 A, 60 A or possibly higher, should the tool system's mechanical components' be able to handle mechanical and thermal stresses imposed by these 40 A and 60 A+ currents.

TABLE 2

Power, Weight Data for Cordless Single-Hand Operated Tools

| Pack Voltage | MODEL No. | Batt. only weight (lb) | Tool-only Weight (lb) | System Weight (lb) | MWO (watts) | W/lb at MWO |
|---|---|---|---|---|---|---|
| 12 V NiCd | DC727 | 1.54 | 2.36 | 3.90 | 225 | 58 |
| 12 V NiCd | DW927 | 1.54 | 2.36 | 3.90 | 225 | 58 |
| 12 V NiCd | DC980 | 1.54 | 3.36 | 4.90 | 225 | 46 |
| 14.4 V NiCd | DW928 | 1.92 | 2.28 | 4.20 | 288 | 69 |
| 14.4 V NiCd | DC728 | 1.92 | 2.78 | 4.70 | 288 | 61 |
| 14.4 V NiCd | DC983 | 1.92 | 3.28 | 5.20 | 288 | 55 |
| 18 V NiCd | DC759 | 2.36 | 2.84 | 5.20 | 385 | 74 |
| 18 V NiCd | DC959 | 2.36 | 2.84 | 5.20 | 385 | 74 |
| 18 V NiCd | DC987 | 2.36 | 3.54 | 5.90 | 420 | 71 |
| AC Corded | D21002 | N/A | 3.65 | 3.65 | 480 | 132 |
| AC Corded | DW223 | N/A | 3.60 | 3.60 | 560 | 156 |
| AC Corded | DW600 | N/A | 4.40 | 4.40 | 600 | 136 |
| 25.2 V Li | N/A | 2.00 | 3.54 | 5.54 | 608 | 110 |
| 28.0 V Li | N/A | 2.02 | 4.18 | 6.20 | 800 | 129 |
| 36 V Li - A | N/A | 2.40 | 4.53 | 6.93 | 775 | 112 |
| 36 V Li - B | N/A | 2.91 | 4.53 | 7.44 | 775 | 104 |

Referring to the curve in FIG. 9, conventional corded single-hand AC tools may produce power from between about 480 Watts to 600 Watts at a total weight of between about 3.6 to 4.4 lbs. These power and weight ranges result in a power-to-weight ratio from about 132 Watts/lb to 156 Watts/lb. These ratios serve as a benchmark to compare the conventional cordless power tool systems and the example cordless power tool systems described herein. The reduced relative weight of the Li-ion battery pack, coupled with greater power output, as compared to the conventional NiCd battery pack, may achieve power-to-weight ratios far exceeding those of conventional cordless power tools.

Referring to Table 2 and FIG. 9, conventional cordless power tools may achieve a power-to-weight ratio between about 46 MWO/lb (225 MWO for a combined tool system weight (tool+12V NiCd pack) of 4.9 lb) to about 74 W/lb (385 MWO for a combined tool system weight (tool+18V NiCd pack) of 5.2 lb). As discussed above and shown in Table 1, the power output of the cordless tools in Tables 2-4 is represented as maximum watts out (MWO). This power output is a maximum power out value from the tool system for a given current value, where current values above the given current value cause power output from the tool to actually decrease. This is because a greater amount of energy, due to the increased current, is converted to heat losses in the battery pack and tool motor.

In further reference to FIG. 9, the bold line represents a cut-off for desired MWO and W/lb ratios for single-hand use cordless power tools in accordance with the example embodiments. The cordless power tool systems of the example embodiments reside above the line. Referring to FIG. 9, cordless single-hand power tools powered by the example Li-ion packs and having a system weight of about at least 5.5 pounds have a minimum MWO of at least 475 watts and a power-to-weight ratio of at least 70 W/lb at MWO. The described 25.2V, 28.0 V and 36.0 V Li-ion powered single-hand use cordless power tool system embodiments of Table 2 are also shown in FIG. 9. The drill configured with the 28.0V Li-ion battery pack had the highest power-to-weight ratio of 129 W/lb at MWO.

As a closest comparative example in terms of total tool system weight, and referring to Table 2, the weight of a single-hand cordless power tool adapted for the conventional 18V NiCd battery pack (such as drill MODEL DC987 in Table 2) alone is 3.54 pounds. Of note, the Model DC987 can optionally be used as a two-hand tool also because it includes a side handle in addition to the conventional handle grip. However, this drill was included in the single-hand tools for purposes of weight comparison. The 18V NiCd battery pack weight is 2.36 lb for a total tool system weight of 5.9 pounds. In this example, the 25.2V Li-ion pack in accordance with the example embodiments weighs 2.0 lbs. The 'empty tool' weight of the 18V drill is the same 3.54 lbs for both the Model DC987 and the tool of the 25.2V Li-ion pack. For the example single-hand cordless tool system, the 25.2V Li-ion pack weighs 0.36 lb less than its conventional cordless 18V NiCd-powered counterpart, while providing substantially greater power output.

Accordingly, the cordless power tool system with the 25.2V pack achieves a calculated MWO=608 W, versus a MWO=420 W for the same single-hand use cordless power tool with the 18V NiCd pack. Referring to FIG. 9, the power-to-weight ratio improvement is readily discernable: 110 W/lb at MWO versus 71 W/lb, given a constant empty tool weight for both the 18V NiCd and 25.2V Li-ion packs. For essentially the same total system weight, this represents almost a 55% power-to-weight ratio improvement for the single-hand use tool system powered by a high-power, lower weight Li-ion battery pack.

Referring again to Table 2, and as a closest comparative example in terms of the nominal voltage ratings of the battery packs, a single-hand power tool powered by a 18V NiCd (Models DC759 or DC959) can achieve a power-to weight ratio of 74 W/lb at MWO of 385 watts. A single-hand power tool powered by the 25.2V Li-ion pack (where the total system weight is 0.34 pounds greater than Models DC759 or DC959), can achieve a power-to weight ratio of 110 W/lb at a MWO of 608 watts.

FIG. 10 is a graph of maximum power out versus tool weight for a cordless two-hand power tool with conventional battery pack, a two-hand corded power tool, and a cordless two-hand power tool with Li-ion battery pack according to an example embodiment of the present invention. The axes in FIG. 10 are the same as shown in FIG. 9.

In another comparative example, an evaluation was made of two-hand use power tools with conventional NiCd battery packs, two-hand use corded power tools, and two-hand use power tools configured with high power Li-ion battery packs in accordance with the example embodiments of the invention. Table 3 illustrates the data evaluated in order to generate the graph in FIG. 10. Similar to Table 2, the data for corded and conventional cordless tools was taken from existing models of DEWALT cordless and AC corded reciprocating saws, and tool-only and battery-only weights are shown for selected models for comparison purposes.

For the 25.2V Li-ion battery pack in the example cordless power tool system embodiments, the tool weight of the reciprocating saw is 4.74 pounds (same as the Model DC385 reciprocating saw), with the pack weight at 2.00 pounds. A cordless reciprocating saw with the 28V Li-ion battery pack had a total system weight of about 8.00 pounds (pack weight 2.02 pounds) and a MWO of 680 watts. An example cordless reciprocating saw configured for 36 V Li-ion battery packs was analyzed with two different 36V Li-ion packs. Tool weight of the reciprocating saw was 5.78 pounds empty, 36V Pack "A" weighed 2.4 pounds and 36V Pack "B" weighed 2.91 lbs. As discussed with respect to FIG. 9, the difference in weights between Li-ion battery packs A and B were due to the cell construction within the battery packs.

Further, the MWO for the example tool system powered by the Li-ion packs was subject to a 30 amp current limit. As discussed above, the 30-amp limit acts as a system restriction to avoid damage in the tool motor and associated gearing, due to excessive currents being generated from the example Li-ion battery packs.

TABLE 3

Power, Weight Data for Cordless Two-Hand Operated Tools

| Pack Voltage | MODEL No. | Batt. only weight (lb) | Tool-only Weight (lb) | System Weight (lb) | MWO (watts) | W/lb at MWO |
|---|---|---|---|---|---|---|
| 14.4 V NiCd | DW937 | 1.92 | 4.08 | 6.00 | 288 | 48 |
| 18 V NiCd | DC385 | 2.36 | 4.74 | 7.10 | 385 | 54 |
| 24 V NiCd | DW006 | 3.30 | 5.40 | 8.70 | 570 | 66 |
| AC Corded | DW309 | N/A | 8.4 | 8.40 | 940 | 112 |
| AC Corded | DW304 | N/A | 7.0 | 7.00 | 820 | 117 |
| 25.2 V Li | N/A | 2.00 | 4.74 | 6.74 | 608 | 90 |
| 28.0 V Li | N/A | 2.02 | 5.98 | 8.00 | 680 | 85 |
| 36 V Li - A | N/A | 2.40 | 5.78 | 8.18 | 825 | 101 |
| 36 V Li - B | N/A | 2.91 | 5.78 | 8.69 | 825 | 95 |

Referring now to FIG. 10, conventional corded, two-hand AC power tools generate between about 820-940 MWO at a system weight between about 7.0 to 8.4 lbs, thus achieving a power-to-weight ratio between about 112-117 MWO/lb. Conventional two-hand cordless power tools weigh between about 6-8.7 lbs and can generate about 288 to 570 MWO. As shown in Table 3 and FIG. 10, conventional two-hand cordless power tools may achieve a power-to-weight ratio between about 48-66 MWO/lb.

Referring to FIG. 10, the power-to-weight ratio for the two-hand cordless power tool with Li-ion pack in accordance with the example embodiments may be at least about 70 W/lb at a power out of at least 575 MWO. FIG. 10 also illustrates the power-to-weight ratios for tools configured with the example 25.2V, 28V and 36V Li-ion packs. As shown in Table 3 and FIG. 10, above at least about 600 MWO, a two-handed tool system weight of between about 6.7 to 8.7 pounds can achieve a power-to-weight ratio of at least 85 W/lb. In another example, the power-to-weight ratio for two-handed cordless power tools powered by the example Li-ion battery packs may range between about 85-101 W/lb.

In a comparative example comparing tool systems with essentially equal total system weight, the two-hand cordless power tool system with the example 25.2V Li-ion pack achieves a power-to-weight ratio of 90 W/lb versus 54 W/lb for the conventional two-hand cordless power tool system with 18V NiCd pack. In a comparative example comparing tool systems with relatively equal nominal voltage ratings of the packs, a two-hand power tool powered by a conventional 24V NiCd battery pack can achieve a power-to weight ratio of 66 W/lb at MWO. A two-hand power tool powered by the 25.2V Li-ion pack (where the total system weight is about 1.66 lb less than a two-hand tool with 24V NiCd pack) can achieve a power-to weight ratio of 90 W/lb at MWO, as compared to 66 W/lb for tool with conventional NiCd pack.

FIG. 11 is a graph of maximum power out versus total tool system weight for a cordless, supported-use power tool with conventional battery pack, a supported-use corded power tool, and a cordless, supported-use power tool with Li-ion battery pack according to an example embodiment of the present invention. The axes in FIG. 11 are the same as shown in FIGS. 9 and 10.

Similar to Tables 2 and 3, the data for corded and conventional cordless tools was taken from existing models of DEWALT cordless and AC corded circular saws, and tool-only and battery-only weights are shown for a selected model for comparison purposes. Additionally, the MWO for the example tool system powered by the Li-ion packs is based on a 30 amp current limit. For the AC corded tools, the MWO values are calculated as 15 amps*120 VAC*0.6 efficiency rating of the tool motor. This is a practical rating based on the current limit of the typical 120 VAC power line. Actual MWO would be 2200 watts with an unlimited current source.

In a further comparative example, an evaluation was made of supported-use power tools with conventional NiCd battery packs, supported-use corded power tools, and supported-use power tools configured with high power Li-ion battery packs in accordance with the example embodiments of the invention. For the 25.2V Li-ion pack the tool weight of the circular saw is 6.04 pounds with the pack weight at 2.00 pounds. For the 28V Li-ion pack the tool weight of the circular saw is 6.68 pounds with the pack weight at 2.02 pounds, for a total system weight of 8.7 pounds. An example 36V cordless circular saw was analyzed with the two 36V Li-ion packs A and B. Tool weight of the 36V circular saw was 7.50 pounds empty, with 36V Pack "A" weighing 2.4 pounds and 36V Pack "B" weighing 2.91 lbs. As discussed with respect to FIG. 9, the difference in weights between Li-ion battery packs A and B were due to the cell construction within the battery packs.

Table 4 below illustrates the data evaluated in order to generate the graph in FIG. 11.

TABLE 4

Power, Weight Data for Cordless Supported-Use Power Tools

| Pack Voltage | Model No. | Batt. only weight (lb) | Tool-only Weight (lb) | System Weight (lb) | MWO (watts) | W/lb at MWO |
|---|---|---|---|---|---|---|
| 14.4 V NiCd | DW935 | 1.92 | 4.88 | 6.80 | 288 | 42 |
| 18 V NiCd | DC390 | 2.36 | 6.34 | 8.70 | 385 | 44 |
| 18 V NiCd | DW936 | 2.36 | 5.24 | 7.60 | 385 | 51 |
| 24 V NiCd | DW007 | 3.27 | 6.53 | 9.80 | 570 | 58 |
| AC Corded | DW364 | N/A | 12.30 | 12.30 | 1080 | 88 |
| AC Corded | DW368 | N/A | 9.50 | 9.50 | 1080 | 114 |
| AC Corded | DW369 | N/A | 9.80 | 9.80 | 1080 | 110 |
| 25.2 V Li | N/A | 2.00 | 6.04 | 8.04 | 608 | 76 |
| 28.0 V Li | N/A | 2.02 | 6.68 | 8.70 | 700 | 80 |
| 36 V Li-A | N/A | 2.40 | 7.50 | 9.90 | 880 | 89 |
| 36 V Li-B | N/A | 2.91 | 7.50 | 10.41 | 880 | 85 |

Referring now to Table 4 and FIG. 11, conventional corded, supported-use tools weighing between about 9.5 to 12.3 lbs and generating a maximum power out of 1080 W may achieve a power-to-weight ratio between about 88-114 W/lb at MWO. Conventional supported-use cordless power tools weighing between about 6.8 to 9.8 lbs can generate about 288 to 570 MWO, achieving a power-to-weight ratio between about 42-58 W/lb at MWO. The 25.2V and 36.0V single-hand use embodiments are also shown in FIG. 11. Table 4 and FIG. 11 also illustrate the power-to-weight ratios for supported-use tools such as the circular saw configured with example 25.2V, 28V and 36V Li-ion packs.

As shown in FIG. 11, the power-to-weight ratio for the supported-use cordless power tool with Li-ion pack in accordance with the example embodiments may be at least about 70 W/lb at a maximum power out of at least 600 MWO. In an example, a supported-use cordless power tool with Li-ion pack, having a system weight of at least about 8.0 lb has a minimum power-to-weight ratio of at least 70 W/lb at MWO. For a weight range of supported tools between about 8.0 to 10.4 pounds, power-to-weight ratio ranges from about 70-90 W/lb at MWO.

The distinctions between supported-use tools with Li-ion packs versus supported-use tools powered by conventional NiCd packs are even more apparent. Referring to Table 4, for a closest comparison of relatively equal total system weights (9.9 and 10.4 lbs for the circular saw with 36V Li-ion pack, versus 8.70 lb for the Model DC390 circular saw with 18V NiCd pack), the W/lb at MWO is roughly double (89 W/lb vs. 44 W/lb). For roughly equal nominal voltage ratings, a supported-use cordless circular saw powered by the 25.2V Li-ion pack (where the total system weight is 1.76 lb less than a conventional supported-use tool with 24V NiCd pack such as the Model DW007 circular saw) can achieve a power-to-weight ratio of 76 W/lb at MWO, as compared to 58 W/lb for the 24V Model DW007 circular saw.

FIGS. 9-11 illustrate that, as compared to cordless power tools utilizing conventional NiCd (or NiMH) battery packs, cordless power tools using the example Li-ion packs as described herein may operate at substantially higher powers, at a relatively reduced weight. Accordingly, high power operations may be achieved in a more ergonomically efficient manner using Li-ion battery packs, since a battery pack having a NiCd (and/or NiMH) cell chemistry would be ergonomically undesirable at or above 24V, due to the weight added with the addition of cells which have a much higher density than Li-ion cells.

Another potential benefit of realizing higher power battery packs such as 36V packs for cordless power tools is that the user may get more power out for a given amperage due to reduced $I^2R$ heat losses (heat loss may be represented as the square of current*resistance) inherent in the tool with the higher rated battery pack. Accordingly, this may result in a more efficient cordless power tool with increased run time.

Figure 12:
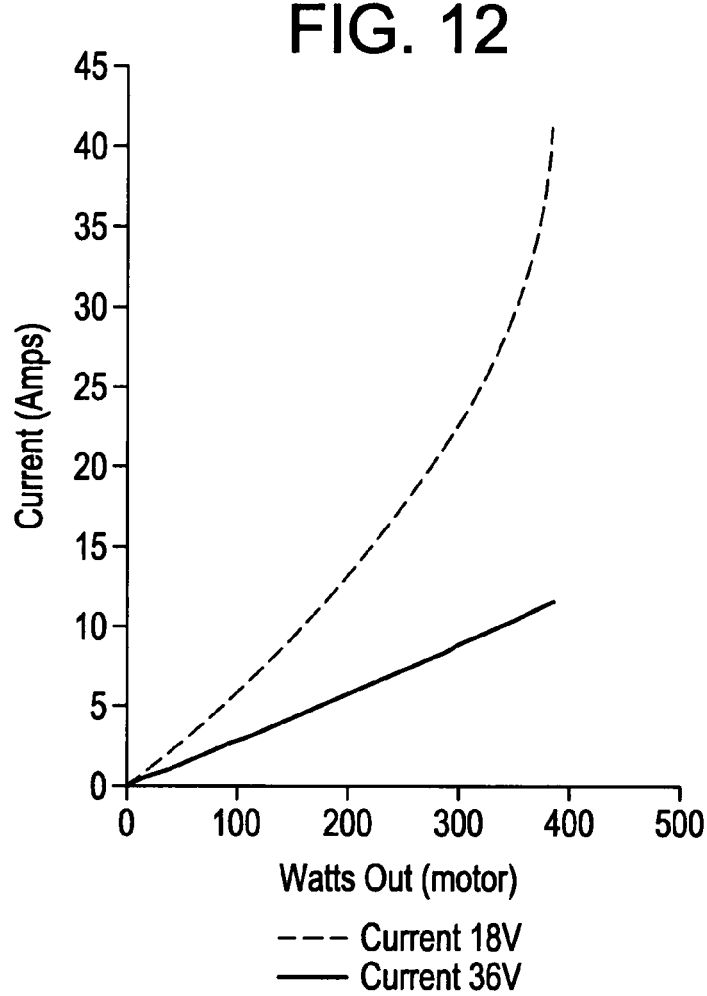
FIG. 12 is a graph of current draw versus power out for an 18V and 36V battery pack.
Figure 13:
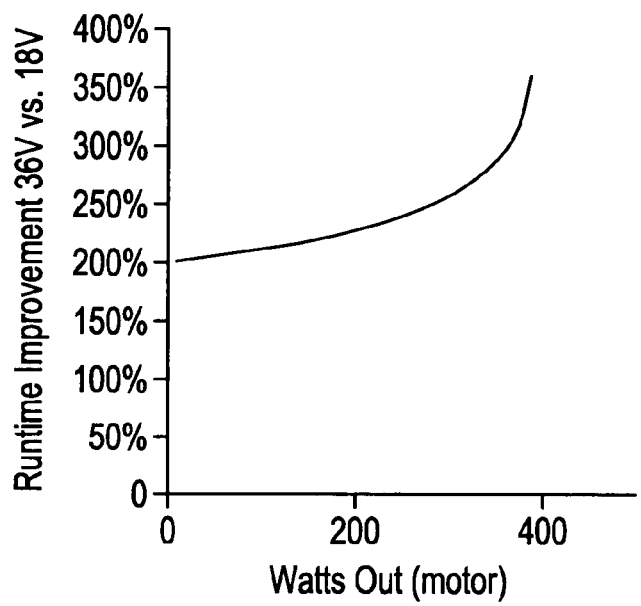
FIG. 13 is a graph illustrating run time improvement for a tool powered by a 36V battery pack as compared to the tool powered by an 18V pack.

FIG. 12 is a graph of current draw versus power out for an 18V and 36V battery pack; and FIG. 13 is a graph illustrating run time improvement for a tool powered by a theoretical 36V battery pack, as compared to the tool powered by a theoretical 18V battery pack.

The chemistry of the battery packs was not considered in this analysis, as the analysis was provided to show run time characteristics for two packs (chemistry independent) at 18V and 36 V). For this comparison, current versus power out and run time aspects for an 18V and a 36V battery pack were analyzed using the same impedance and pack capacity characteristics: pack impedance of 0.15 ohms, motor impedance (in the tool) of 0.06 ohms, and pack capacity of 2.4 A-hr.

The analysis is designed to illustrate the benefits of using a higher voltage battery pack in the cordless tool. Referring to FIGS. 12 and 13, the tool with the 36V battery pack drew much less current for the same power out. Thus, $I^2R$ heat losses for the tool with the 36V power pack are much less than for the tool with the 18V pack.

For example, at a power out of 300 W, the current draw for the tool with the 18V pack was about 22.6 amps, versus about 8.8 amps for the 36V tool. Accordingly, for a 300 W output a cordless tool with a 36V pack may realize an improvement of over 2.5 times the run time, as compared to the tool with the 18V pack. The following Table 5 illustrates the data generated in this analysis, and shows currents (in amps) and run time (hours) for the 18V and 36V packs at different power levels.

Additionally, the far right column indicates the percent increase in run time for the 36V pack as compared to the 18V pack.

TABLE 5

18 V vs. 36 V Power Source Comparison

| POWER (Watts) | Current - 18 V pack (Amps) | Current - 36 V pack (Amps) | Run time 18 V pack (Hours) | Run time 36 V Pack (Hours) | % increase run time 36 V vs. 18 V |
|---|---|---|---|---|---|
| 10 | 0.559204 | 0.278229 | 257.5089676 | 517.5586345 | 201% |
| 20 | 1.1259 | 0.557368 | 127.8976386 | 258.35726 | 202% |
| 30 | 1.700399 | 0.837424 | 84.68599764 | 171.9558765 | 203% |
| 40 | 2.283032 | 1.118408 | 63.0740281 | 128.7544838 | 204% |
| 50 | 2.874153 | 1.400328 | 50.1017121 | 102.8330819 | 205% |
| 60 | 3.474146 | 1.683193 | 41.4490302 | 85.55167057 | 206% |
| 70 | 4.083423 | 1.967014 | 35.26453274 | 73.20739261 | 208% |
| 80 | 4.702427 | 2.251801 | 30.62248245 | 63.94881931 | 209% |
| 90 | 5.331641 | 2.537562 | 27.00856852 | 56.74737913 | 210% |
| 100 | 5.971587 | 2.824309 | 24.11419204 | 50.98592907 | 211% |
| 110 | 6.622834 | 3.112051 | 21.74295921 | 46.27174174 | 213% |
| 120 | 7.286001 | 3.400798 | 19.76392771 | 42.34299882 | 214% |
| 130 | 7.96177 | 3.690563 | 18.08643144 | 39.01844144 | 216% |
| 140 | 8.650886 | 3.981354 | 16.6456944 | 36.16859894 | 217% |
| 150 | 9.354173 | 4.273184 | 15.39419869 | 33.69852612 | 219% |
| 160 | 10.07254 | 4.566063 | 14.29628921 | 31.53701405 | 221% |
| 170 | 10.80701 | 4.860003 | 13.32468209 | 29.6296088 | 222% |
| 180 | 11.55871 | 5.155016 | 12.45813655 | 27.93395729 | 224% |
| 190 | 12.32891 | 5.451113 | 11.67986135 | 26.41662283 | 226% |
| 200 | 13.11906 | 5.748307 | 10.97639856 | 25.05085605 | 228% |
| 210 | 13.93078 | 6.046609 | 10.33682538 | 23.81500265 | 230% |
| 220 | 14.76594 | 6.346032 | 9.752172533 | 22.69134545 | 233% |
| 230 | 15.62671 | 6.646589 | 9.214992865 | 21.66524849 | 235% |
| 240 | 16.51559 | 6.948293 | 8.719036005 | 20.7245151 | 238% |
| 250 | 17.43553 | 7.251157 | 8.258998537 | 19.85890006 | 240% |
| 260 | 18.39003 | 7.555195 | 7.830328448 | 19.0597343 | 243% |
| 270 | 19.38332 | 7.860419 | 7.429068276 | 18.31963302 | 247% |
| 280 | 20.42054 | 8.166846 | 7.051725049 | 17.63226637 | 250% |
| 290 | 21.50808 | 8.474488 | 6.695157031 | 16.99217756 | 254% |
| 300 | 22.65409 | 8.78336 | 6.35646753 | 16.39463732 | 258% |
| 310 | 23.86914 | 9.093477 | 6.032894125 | 15.83552661 | 262% |
| 320 | 25.16745 | 9.404855 | 5.721675806 | 15.31124122 | 268% |
| 330 | 26.56892 | 9.717508 | 5.419866011 | 14.8186138 | 273% |
| 340 | 28.10292 | 10.03145 | 5.124022593 | 14.35484959 | 280% |
| 350 | 29.81613 | 10.34671 | 4.82960069 | 13.91747319 | 288% |
| 360 | 31.79148 | 10.66328 | 4.529516003 | 13.50428426 | 298% |
| 370 | 34.20671 | 10.9812 | 4.209699975 | 13.11332026 | 312% |
| 380 | 37.64074 | 11.30048 | 3.825642359 | 12.74282522 | 333% |
| 381 | 38.11911 | 11.33248 | 3.777633047 | 12.7068394 | 336% |
| 382 | 38.65154 | 11.3645 | 3.725595174 | 12.67104091 | 340% |
| 383 | 39.26198 | 11.39653 | 3.667670015 | 12.63542826 | 345% |
| 384 | 40 | 11.42857 | 3.6 | 12.6 | 350% |
| 385 | 41.01287 | 11.46063 | 3.511093403 | 12.5647547 | 358% |
| 386 | — | 11.4927 | — | 12.52969094 | — |
| 387 | — | 11.52479 | — | 12.4948073 | — |
| 388 | — | 11.55689 | — | 12.46010239 | — |
| 389 | — | 11.589 | — | 12.42557483 | — |
| 390 | — | 11.62113 | — | 12.39122325 | — |
| 391 | — | 11.65327 | — | 12.35704631 | — |
| 392 | — | 11.68543 | — | 12.32304267 | — |
| 393 | — | 11.7176 | — | 12.28921099 | — |
| 394 | — | 11.74978 | — | 12.25554998 | — |
| 395 | — | 11.78198 | — | 12.22205833 | — |
| 396 | — | 11.81419 | — | 12.18873476 | — |
| 397 | — | 11.84641 | — | 12.15557799 | — |
| 398 | — | 11.87865 | — | 12.12258678 | — |
| 399 | — | 11.91091 | — | 12.08975986 | — |
| 400 | — | 11.94317 | — | 12.05709602 | — |
| 401 | — | 11.97546 | — | 12.02459402 | — |
| 402 | — | 12.00775 | — | 11.99225266 | — |
| 403 | — | 12.04006 | — | 11.96007074 | — |
| 404 | — | 12.07239 | — | 11.92804707 | — |

In Table 5, the tool powered by the theoretical 18V pack (chemistry independent) cannot provide in excess of about 385 W due to the excessive current draw of 40+ amps. The heat losses at or above this current draw create losses in the battery pack and/or tool motor which exceed the energy required to turn the motor. Accordingly, for a 300 W output a cordless tool with the theoretical 36V pack may realize almost a 260% improvement in terms of run time, as compared to the tool with the 18V pack. Moreover, the much lower current draw of the 36V pack, coupled with the higher voltage, enables the battery pack to generate much higher power than the 18V pack. As shown below, a 2× or greater improvement in run-time may be achievable with cordless power tools powered by the example Li-ion battery packs as described herein, as compared to conventional 18V battery packs having a NiCd chemistry.

Comparative Run Time Analyses: Two-Handed Use Cordless Power Tools

A comparative analysis for primarily two-handed use cordless power tools was performed between a cordless hammerdrill powered by the 36V Li-ion Pack A in Table 4, and a DEWALT Model DC988 cordless hammerdrill powered by an 18V NiCd battery pack. The 18V NiCd battery pack used for all the comparative analyses with different tools, to be described below, was the DEWALT 18V XRP™ battery pack, Model DC9096. Each pack was fully charged prior to the test. The test consisted of drilling 1" deep auger holes along the length of a 2 inch-by-10 inch (2×10) yellow pine board, to determine how many holes could be drilled until battery pack power failure requiring recharge. The hammerdrill with the 36V Li-ion Pack A drilled 183 holes, as compared to 77 holes for the 18V Model DC988 cordless hammerdrill. This represented a run time improvement for the 36V hammerdrill of approximately 238% over the run time achieved by the hammerdrill powered with the conventional 18V NiCd pack.

Another comparative analysis for two-handed use cordless power tools was performed between a cordless reciprocating saw powered by the 36V Li-ion Pack A in Table 4, and a DEWALT Model DC385 cordless reciprocating saw powered by an 18V NiCd battery pack (DEWALT Model 9096). Each pack was fully charged prior to the test. The test consisted of making cross cuts into a 2-inch by-four inch (2×4) yellow pine board, to determine how many cross-cuts could be made until battery pack power failure requiring recharge. The reciprocating saw with the 36V Li-ion Pack A made 183 cross cuts, as compared to 74 cross cuts for the 18V Model DC385 Cordless reciprocating saw. This represented a run time improvement for the 36V reciprocating of approximately 247% over the run time achieved by the reciprocating saw powered with the conventional 18V NiCd pack.

Comparative Run Time Analyses: Supported-Use Cordless Power Tools

A comparative analysis for supported-use tools was performed using a cordless circular saw powered by the 36V Li-ion Pack A in Table 4, and a DEWALT Model DC390 cordless circular saw powered by an 18V NiCd battery pack (DEWALT Model 9096). Each pack was fully charged prior to the test. The test consisted of making cross cuts across a 2×10 yellow pine board, to determine how many cross-cuts could be made until battery pack power failure requiring recharge. The circular saw with the 36V Li-ion Pack A made 92 cross cuts, as compared to 38 cross cuts for the 18V Model DC390 circular saw. This represented a run time improvement for the 36V circular saw of approximately 242% over the run time achieved by the circular saw powered with the conventional 18V NiCd pack.

Another comparative analysis for supported-use tools was performed between a cordless jigsaw powered by the 36V Li-ion Pack A in Table 4, and a DEWALT Model DC330 cordless jigsaw powered by an 18V NiCd battery pack (DEWALT Model 9096). Each pack was fully charged prior to the test. The test consisted of making cuts across a 3 meter long laminate, to determine how many 3-meter long jigsaw cuts (passes) could be made through the 3 m laminate until battery pack power failure requiring recharge. The jigsaw with the 36V Li-ion Pack A made 43.5 passes thru the length of the 3 m laminate, as compared to 16.5 passes for the 18V Model DC330 cordless jigsaw. This represented a run time improvement for the 36V jigsaw of approximately 264% over the run time achieved by the jigsaw powered with the conventional 18V NiCd pack.

Accordingly, as shown above, cordless power tools employing high-powered battery packs based on a Li-ion cell chemistry may yield substantial improvements in efficiency and run time for those tools, as compared to cordless tools powered by conventional battery packs having NiCd and/or NiMH cell chemistries. Moreover, the lighter-weight, high-power Li-ion packs may provide substantial ergonomic improvements in terms of overall tool system weight, while achieving substantial power-to-weight ratio improvements over the conventional battery packs.

The use of reduced weight, higher-power Li-ion battery packs in cordless power tool systems may lead to weight improvements in other parts of the tool system. For example, the lighter Li-ion pack may shift the center of gravity of the tool, which may be compensated for by reductions in the thickness (and hence weight) of the motor magnets in the tool motor, and/or reductions in the cumulative or distributed weight of transmission/gearing components in the tool, in an effort to achieve the desired overall balance of the tool system.

As exemplified by Table 5, based on the same impedance and pack capacity characteristics, and due to the higher voltages of Li-ion packs, Li-ion battery packs require less current to achieve a given power, as compared to the conventional NiCd or NiMH battery packs. As such, the lower current may facilitate reductions in components carrying the current (i.e., smaller wire diameters throughout the tool system, smaller heat dissipation components such as heat sinks, smaller motor magnets due to reduced demag concerns at the lower currents, etc.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed:

1. A cordless power tool system, comprising:
a plurality of hand-held cordless power tools, each tool having a tool housing, motor assembly, transmission/gear assembly and removable battery pack providing a nominal output voltage of approximately 25 volts or greater to a DC motor of the motor assembly,
wherein each of the tools of the system has a power output to weight ratio of 70 watts per pound (W/lb) or greater.

2. The system of claim 1, wherein a combined system weight of the tool housing, motor assembly, transmission/gear assembly and battery pack for any given tool of the system is at least 5.5 pounds.

3. The system of claim 1, wherein the power output to weight ratio for any given tool of the system is within a range between about 76 to 129 W/lb.

4. The system of claim 1, wherein each given tool of the system has a power output in a range between about 500 to 900 Watts.

5. The system of claim 4, wherein the power output is a maximum power out value of the tool for a given current value, wherein if additional current is applied to the system above the given current value, the power output falls as a greater amount of energy, due to the increased current, is converted to heat losses in the battery pack and motor.

6. The system of claim 1, wherein the battery pack has a current limit set therein.

7. The system of claim 1, wherein the battery pack contains a plurality of lithium ion cells.

8. The system of claim 1, wherein total battery pack weight for any given tool of the system is within a range between about 2.0 to 2.9 pounds.

9. The system of claim 1, wherein a given tool of the system is one of a drill driver, impact wrench, reciprocating saw, angle grinder, hammerdrill, circular saw and jigsaw.

10. A hand-held cordless power tool system, comprising:
   a tool housing,
   a motor assembly,
   a transmission/gear assembly, and
   a removable battery pack attached to the tool housing, the battery pack having a plurality of lithium-ion cells providing a nominal voltage of at least 28V,
   the system having a power output to weight ratio of 80 watts per pound (W/lb) or greater.

11. The system of claim 10, wherein cordless power tools of the system include one or more of a primarily single-hand operated power tool, a primarily two-hand operated power tool, and a supported-use power tool which primarily requires a support structure for use.

12. The system of claim 11, wherein a combined system weight of the tool housing, motor assembly, transmission/gear assembly and battery pack for a given tool of the system is at least 6.2 pounds.

13. The system of claim 11, wherein the power output to weight ratio for a given tool of the system is in a range between about 80 to 129 W/lb.

14. The system of claim 11, wherein a given tool of the system has a power output in a range between about 500 to 900 Watts.

15. The system of claim 11, wherein the primarily single-hand operated power tool of the system is embodied as one of a drill driver and an impact wrench.

16. The system of claim 11, wherein the primarily two-hand operated power tool of the system is embodied as one of a reciprocating saw, an angle grinder and a hammerdrill.

17. The system of claim 11, wherein the supported-use power tool which primarily requires a support structure for use is embodied as one of a circular saw and a jigsaw.

18. The system of claim 10, wherein the battery pack has a current limit set therein.

19. The system of claim 10, wherein total battery pack weight is in a range between about 2.0 to 2.9 pounds.

20. A hand-held cordless power tool, comprising:
   a tool housing,
   a motor assembly,
   a transmission/gear assembly, and
   a removable battery pack attached to the tool housing,
   the tool having a power output of at least 500 watts and a power output to weight ratio of 80 watts per pound (W/lb) or greater.

21. The power tool of claim 20, wherein
   a combined system weight of the tool housing, motor assembly, transmission/gear assembly and battery pack is at least 6.2 pounds, and
   the weight of the battery pack alone is in a range between about 2.0 to 2.9 pounds.

22. The power tool of claim 20, wherein the power output to weight ratio is in a range between about 80 to 129 W/lb.

23. The power tool of claim 20, wherein the battery pack provides a nominal voltage of at least 28V to a DC motor of the motor assembly.

24. The power tool of claim 20, wherein the battery pack contains a plurality of lithium ion cells.

* * * * *